United States Patent
Choi et al.

(10) Patent No.: US 10,439,881 B2
(45) Date of Patent: Oct. 8, 2019

(54) METHOD AND APPARATUS FOR PREDICTING STORAGE DISTANCE

(71) Applicant: Samsung Electronics Co., Ltd., Suwon-si, Gyeonggi-do (KR)

(72) Inventors: Inseok Stephen Choi, Redwood City, CA (US); Yang Seok Ki, Palo Alto, CA (US); Byoung Young Ahn, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 352 days.

(21) Appl. No.: 15/222,938

(22) Filed: Jul. 28, 2016

(65) Prior Publication Data
US 2017/0346699 A1  Nov. 30, 2017

Related U.S. Application Data

(60) Provisional application No. 62/341,057, filed on May 24, 2016.

(51) Int. Cl.
| | |
|---|---|
| *H04L 12/58* | (2006.01) |
| *G06F 12/14* | (2006.01) |
| *H04L 12/24* | (2006.01) |
| *G06F 3/06* | (2006.01) |
| *G06F 12/1009* | (2016.01) |

(Continued)

(52) U.S. Cl.
CPC ............ *H04L 41/12* (2013.01); *G06F 3/0604* (2013.01); *G06F 3/067* (2013.01); *G06F 3/0632* (2013.01); *G06F 3/0635* (2013.01); *G06F 3/0653* (2013.01); *G06F 3/0664* (2013.01); *G06F 12/1009* (2013.01); *H04L 43/0852* (2013.01); *H04L 43/0888* (2013.01); *H04L 67/1097* (2013.01); *G06F 3/0611* (2013.01); *G06F 2212/1024* (2013.01); *G06F 2212/154* (2013.01); *G06F 2212/2022* (2013.01)

(58) Field of Classification Search
CPC ...... H04L 41/12; G06F 3/0611; G06F 3/0653; G06F 3/067
See application file for complete search history.

(56) References Cited

U.S. PATENT DOCUMENTS

| | | | |
|---|---|---|---|
| 6,493,656 B1 | 12/2002 | Houston et al. | |
| 2003/0200390 A1* | 10/2003 | Moore | ................. G06F 3/0601 711/114 |

(Continued)

OTHER PUBLICATIONS

Final Office Action for U.S. Appl. No. 15/225,811, dated Jul. 10, 2018.

(Continued)

*Primary Examiner* — Nicholas R Taylor
*Assistant Examiner* — Sanjoy Roy
(74) *Attorney, Agent, or Firm* — Renaissance IP Law Group LLP

(57) ABSTRACT

A system for answering queries regarding a system topology and local storage information in a data center is described. The system may include reception logic and transmission logic that may receive and send data, respectively. Among the data that may be received and sent are queries and responses. The system may have storage for a storage graph, which may include nodes and multi-weight edges. A storage distance predictor may use the storage graph to generate the responses to the queries.

22 Claims, 22 Drawing Sheets

(51) Int. Cl.
*H04L 29/08* (2006.01)
*H04L 12/26* (2006.01)

(56) References Cited

U.S. PATENT DOCUMENTS

| | | |
|---|---|---|
| 2004/0117580 A1 | 6/2004 | Wu et al. |
| 2004/0215883 A1 | 10/2004 | Bamford et al. |
| 2006/0259686 A1 | 11/2006 | Sonobe |
| 2009/0070547 A1 | 3/2009 | Jeong et al. |
| 2009/0238078 A1* | 9/2009 | Robinson ............... G06F 9/505 370/241 |
| 2011/0066837 A1 | 3/2011 | Lee et al. |
| 2011/0296052 A1 | 12/2011 | Guo et al. |
| 2012/0005236 A1* | 1/2012 | Deng .................... G06F 8/10 707/798 |
| 2012/0188249 A1* | 7/2012 | Kretz .................... G06N 5/02 345/440 |
| 2012/0254581 A1 | 10/2012 | Kim |
| 2013/0031559 A1 | 1/2013 | Alicherry |
| 2013/0086303 A1 | 4/2013 | Ludwig et al. |
| 2013/0227563 A1 | 8/2013 | McGrath |
| 2013/0297907 A1 | 11/2013 | Ki et al. |
| 2014/0089278 A1 | 3/2014 | Lovinger et al. |
| 2014/0181595 A1 | 6/2014 | Hoang et al. |
| 2014/0258535 A1* | 9/2014 | Zhang ............... H04L 41/0806 709/226 |
| 2015/0134879 A1 | 5/2015 | Zheng et al. |
| 2015/0178191 A1 | 6/2015 | Camp et al. |
| 2015/0379420 A1* | 12/2015 | Basak ................. H05K 999/99 706/12 |
| 2016/0004449 A1* | 1/2016 | Lakshman ............ G06F 3/065 711/162 |
| 2016/0070480 A1 | 3/2016 | Babu et al. |
| 2016/0139838 A1 | 5/2016 | D'Sa et al. |
| 2016/0259586 A1 | 9/2016 | Tylik et al. |
| 2016/0292025 A1 | 10/2016 | Gupta et al. |
| 2016/0337202 A1* | 11/2016 | Ben-Itzhak .......... H04L 45/745 |
| 2016/0378356 A1 | 12/2016 | Colgrove et al. |
| 2017/0123852 A1* | 5/2017 | Chagalakondu .... G06F 9/45558 |

OTHER PUBLICATIONS

Final Office Action for U.S. Appl. No. 15/227,955, dated Jun. 13, 2018.
Office Action for U.S. Appl. No. 15/225,811, dated Dec. 27, 2017.
Office Action for U.S. Appl. No. 15/227,955, dated Dec. 28, 2017.
Meng, Xiaogiao, et al., "Improving the Scalability of Data Center Networks with Traffic-aware Virtual Machine Placement," INFOCOM, 2010 Proceedings IEEE, 9 pages.
Colgrove, John, et al., "Purity: Building Fast, Highly-Available Enterprise Flash Storage from Commodity Components", Proceedings of the 2015 ACM SIGMOD International Conference on Management of Data, ACM, 2015, 12 pages.
Dirik, Cagdas, et al., "The Pertormance of PC Solid-State Disks (SSDs) as a Function of Bandwidth, Concurrency, Device Architecture, and System Organization," ISCA 2009, Jun. 20-24, 2009, ACM SIGARCH Computer Architecture News. vol. 37. No. 3. ACM, 2009.
Office Action for U.S. Appl. No. 15/227,955, dated Sep. 7, 2018.
Final Office Action for U.S. Appl. No. 15/227,955, dated Jan. 3, 2019.
Office Action for U.S. Appl. No. 15/225,811, dated Jan. 2, 2019.
Notice of Allowance for U.S. Appl. No. 15/225,811, dated Jul. 8, 2019.
Notice of Allowance for U.S. Appl. No. 15/227,955, dated May 16, 2019.

* cited by examiner

METHOD AND APPARATUS FOR PREDICTING STORAGE DISTANCE

RELATED APPLICATION DATA

This application claims the benefit of U.S. Provisional Patent Application Ser. No. 62/341,057, filed May 24, 2016, which is incorporated by reference herein for all purposes.

This application is related to U.S. patent application Ser. No. 15/225,811, filed Aug. 1, 2016, which claims the benefit of U.S. Provisional Patent Application Ser. No. 62/341,059, filed May 24, 2016, both of which are incorporated by reference herein for all purposes.

This application is related to U.S. patent application Ser. No. 15/227,955, filed Aug. 3, 2016, which claims the benefit of U.S. Provisional Patent Application Ser. No. 62/341,063, filed May 24, 2016, both of which are incorporated by reference herein for all purposes.

This application is related to U.S. Provisional Patent Application Ser. No. 62/352,509, filed Jun. 20, 2016, which is incorporated by reference herein for all purposes.

FIELD

The inventive concepts relate generally to storage devices, and more particularly to determining what subset of storage devices in a data center may best support an application.

BACKGROUND

Storage devices, particularly Solid State Drives (SSDs), exhibit continuously-changing characteristics over time. SSDs may have unpredictable latency and/or bandwidth due to the underlying software (i.e., firmware) and/or hardware inside the SSD. Prolonged access latency (read/program/erase) due to wear leveling may also affect latency and/or bandwidth. Virtual abstraction—that is, different approaches such as polymorphic SSDs, open-channel SSDs, and light-NVM (a subsystem that supports open-channel SSDs), to name a few—make it hard to predict an SSD's performance characteristics. Finally, different cell densities—such as Single Level Cell (SLC), Multi-Level Cell (MLC), Three Level Cell (TLC), and Quadruple Level Cell (QLC), to name a few—cause quite different characteristics.

But while a storage device might know its own performance characteristics—latency, bandwidth, and so on—the performance characteristics across storage devices is a more complicated matter. That is, although per-device performance is known, it is much bigger problem to predict performance between two or multi devices (including virtual devices). One pair of storage devices might have one calculated latency and/or bandwidth, while another pair of storage devices—even if identical in make, model, and manufacture to the first pair—might have different performance characteristics.

A need remains for a way to predict performance between multiple storage devices.

DETAILED DESCRIPTION

Figure 1:
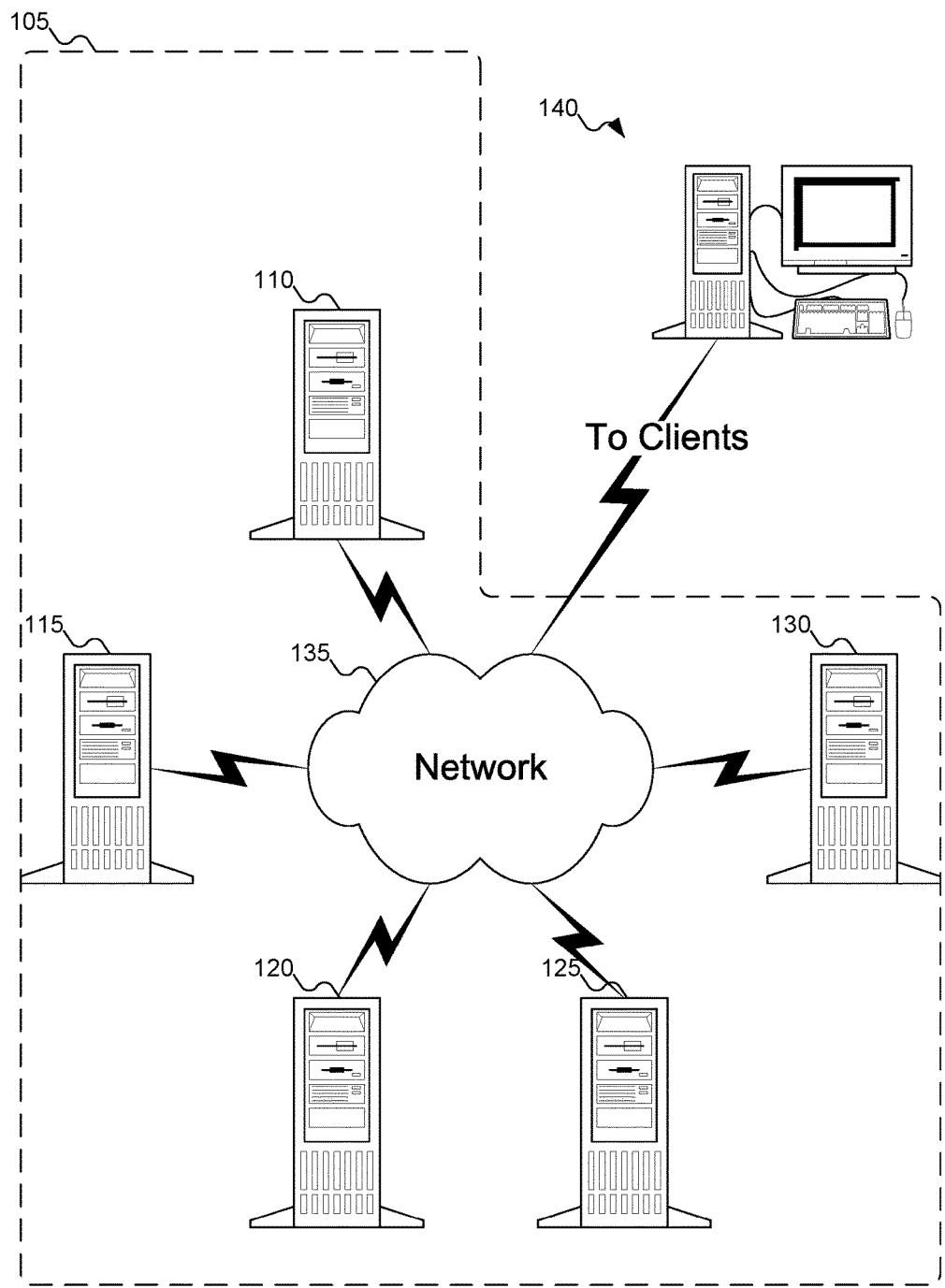
FIG. 1 shows a data center with various host machines, communicating with a client machine.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Large-scale data center storage infrastructure systems may benefit from an ability to predict latency and bandwidth between any pair of host and storage (or storage to storage). There are also increasing demands for more information because large-scale data centers should manage and decide many different aspects of data storage, including parallelism, replication, isolation, and so on. Such predictors should not be based on on-demand or per-pair measurements, because such approaches do not scale.

Unfortunately, existing storage modeling based on specifications or profiling might not satisfy such demands. This is because storage devices may show heterogeneous latency/bandwidth and time-varying characteristics due to aging/wearing-out and hidden characteristics such as the Flash Translation Layer (FTL), despite the storage devices themselves being of identical manufacture and even physical age.

Another obstacle to predict storage distance—that is, the performance characteristics related to the distance between a pair of storage devices within a data center—is that pair-wise prediction requires too many measurements (considering all-to-all connections). Distance is an abstract concept that can encompass difficulties in communicating between pairs of storage devices. Distance may include portions derived from factors such as physical distance (for example, line-latency and/or bandwidth), but is not necessarily defined purely by physical distance. In a broader sense, "distance" (as measured between two storage devices in a storage graph, and using one or more edges), may include contributions from additional factors such as the number and behavior of intervening switches and nodes, and other networking components, as well as the device latencies themselves.

It is important to understand the latency/bandwidth of given storage pairs. But even knowing per-device performance, it is a much bigger problem to predict performance between multiple devices (including virtual devices).

A storage distance graph/tree may be built by combining a topology graph/tree with per-storage device performances. In general, system topologies change infrequently, compared with the variations/changes in the performance of storage devices. The description below describes how to generate such a storage graph.

A storage distance predictor, combined with a storage graph/tree generator, may provide a technical solution to this problem. The storage distance predictor is based on a graph/tree generated by a storage graph generator. First, the storage graph generator takes inputs of the system topology (physical, virtual, or both) and local storage information. The storage graph generator may then output a multi-weighted storage graph/tree. Based on this storage graph, the storage distance predictor may provide metrics for large-scale data center storage infrastructure systems.

Unlike P2P, grid applications, or web topologies, large-scale data centers commonly exhibits structural and hierarchical organization. And barring failures or system expansions, the structure and hierarchical organization of data centers is unlikely to change.

The data center environment may also include virtualized storage interfaces. The storage graph/tree may therefore be extended to reflect virtual storage devices. Virtual storage devices may interface with physical storage devices in any combination of one-to-one, one-to-multi, multi-to-one, or multi-to-multi. While the storage graph/tree is extended to include virtual storage devices, particularly where one virtual storage device may span multiple physical storage devices, aggregated vertices and aggregated multi-weight edges may be generated.

Each edge in the storage graph/tree may have multiple weights. These weights may represent distance, latency, bandwidth, and various identifiers, among other possibilities, in a tuple.

Each virtual storage devices' performance may be measured in various ways, including the system and method described in U.S. patent application Ser. No. 15/225,811, filed Aug. 1, 2016, which claims the benefit of U.S. Provisional Patent Application Ser. No. 62/341,059, filed May 24, 2016, both of which are incorporated by reference herein for all purposes.

Based on a generated storage distance tree/graph, the storage distance predictor may provide solutions depending on queries. The storage distance predictor may provide a set of virtual storage devices satisfying minimum bandwidth with a latency constraint while providing a target degree of parallelism. Assuming that a pruning heuristic is used to eliminate unsatisfactory vertices, partial trees may be expanded to search for a tree satisfying the indicated requirements.

The storage distance predictor may also provide a set of virtual storage devices to guarantee that one particular application does not share a storage node with other identified applications.

FIG. 1 shows a data center with various host machines, communicating with a client machine. In FIG. 1, data center 105 is shown as including host machines 110, 115, 120, 125, and 130. More detail about host machines 110, 115, 120, 125, and 130 is shown with reference to FIGS. 2-3 below. Data center 105 may also include network 135 that permits host machines 110, 115, 120, 125, and 130 to communicate with each other and with client machines 140. Network 135 may be any variety of network, including a Local Area Network (LAN) or a Wide Area Network (WAN). Network 130 may use wireline technology—such as Ethernet—wireless technology—such as any of the IEEE 802.11 a/b/g/n/ac or equivalent or replacement technologies—or a combination of the two. In addition, while FIG. 1 suggests that host machines 110, 115, 120, 125, and 130 are located within a single geographic area, in other embodiments of the inventive concept host machines 110, 115, 120, 125, and 130 may be geographically dispersed and interconnected using a global network, such as the Internet (possibly using an overlay network, such as a Virtual Private Network (VPN)).

While FIG. 1 shows host machines 110, 115, 120, 125, and 130 as identical and all as tower computers, embodiments of the inventive concept may support any desired formats for host machines 110, 115, 120, 125, and 130, which may all be different. For example, some host machines 110, 115, 120, 125, and 130 might be tower computers of various models and manufacture, and other host machines 110, 115, 120, 125, and 130 might be rack-mounted server of various models and manufacture. Different host machines 110, 115, 120, 125, and 130 may have different capabilities, in terms of processor capability, available memory, and available storage, all of which may be of varying formats. For example, some host machines 110, 115, 120, 125, and 130 might use Dynamic Random Access Memory (DRAM) for member, while others might use Persistent Random Access Memory (PRAM), Static Random Access Memory (SRAM), Ferroelectric Random Access Memory (FRAM), or Non-Volatile Random Access Memory (NVRAM), such as Magnetoresistive Random Access Memory (MRAM). Similarly, some host machines 110, 115, 120, 125, and 130 might use conventional hard disk drives for storage, while others might use flash memory (a variety of NVRAM) or MRAM. Other possibilities, whether or not enumerated here, are also within the scope of the inventive concept.

As noted above, host machines 110, 115, 120, 125, and 130 are all essentially equivalent and interchangeable. Accordingly, any reference to host machine 110 in the remainder of this document is intended to encompass any and all of host machines 110, 115, 120, 125, and 130, without limitation.

While FIG. 1 shows client machines 140 as a conventional minitower computer system, with monitor, keyboard, and mouse, client machines 140 may take any desired form, including laptop computers, tablet computers, smartphones, and any other desired technological format. In addition, while FIG. 1 shows a single client machine 140, embodiments of the inventive concept may support any number of client machines 140 simultaneously.

Figure 2:
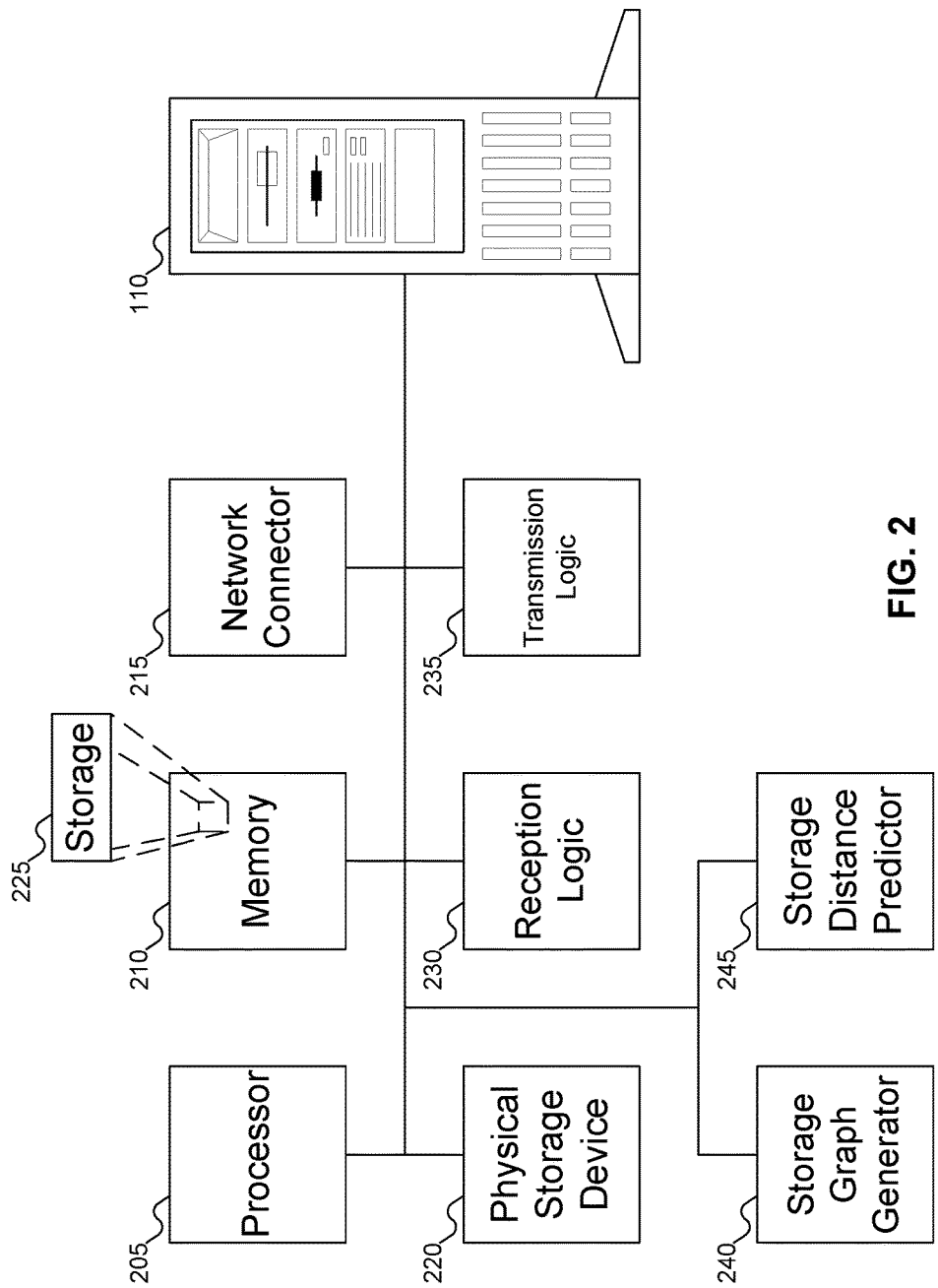
FIG. 2 shows details of a host machine of FIG. 1, according to an embodiment of the inventive concept.

FIG. 2 shows details of host machine 110 of FIG. 1, according to an embodiment of the inventive concept. In FIG. 2, host machine 110 is shown as including processor 205 (also referred to as a Central Processing Unit (CPU)), memory 210, network connector 215, and storage device 220. Processor 205 may be any variety of processor: for example, an Intel Xeon, Celeron, Itanium, or Atom processor, an AMD Opteron processor, an ARM processor, etc. As described above, memory 210 may be any variety of memory, such as flash memory, SRAM, PRAM, etc. but is typically DRAM. Memory 210 may include storage 225, which may store a data structure for the storage graph (discussed further with reference to FIGS. 7-10 below). Network connector 215 may be any variety of connector that may connect host machine 110 to network 135 of FIG. 1: for example, an Ethernet interface or a wireless interface. Storage device 220 may be any variety of storage device that may be used by a data center. While Solid State Drives (SSDs) are one possibility for storage device 220, storage device 220 may also include other storage forms, such as hard disk drives or other long-term storage devices.

Host machine 110 may also include reception logic 230, transmission logic 235, storage graph generator 240, and storage distance predictor 245. Reception logic 230 and transmission logic 235 may be used to receive data at and send data from host machine 110, respectively. Reception logic 230 and transmission logic 235 may interface with network connector 215 to achieve communication with other machines across network 135 of FIG. 1 and other networks. Reception logic 230 may include both the hardware that enables communication between machines and software to support such communication. For example, client machine 115 might issue requests via a Secure Shell (SSH), a web interface, or an Application Program Interface (API).

Storage graph generator 240 may generate a storage graph from a system topology and local storage information. Storage distance predictor 245 may take the storage graph produced by storage graph generator 235 and answer queries relating to the storage graph. Storage graph generator 240 and storage distance predictor are discussed further with reference to FIGS. 11-14 below.

By using a storage graph, storage distance predictor 245 may answer queries regarding the system topology and the local storage information. These answers may solve the technical problem of selecting storage devices to support a particular application, given the various requirements of different applications and the heterogeneous nature of the system topology and local storage information.

Figure 3:
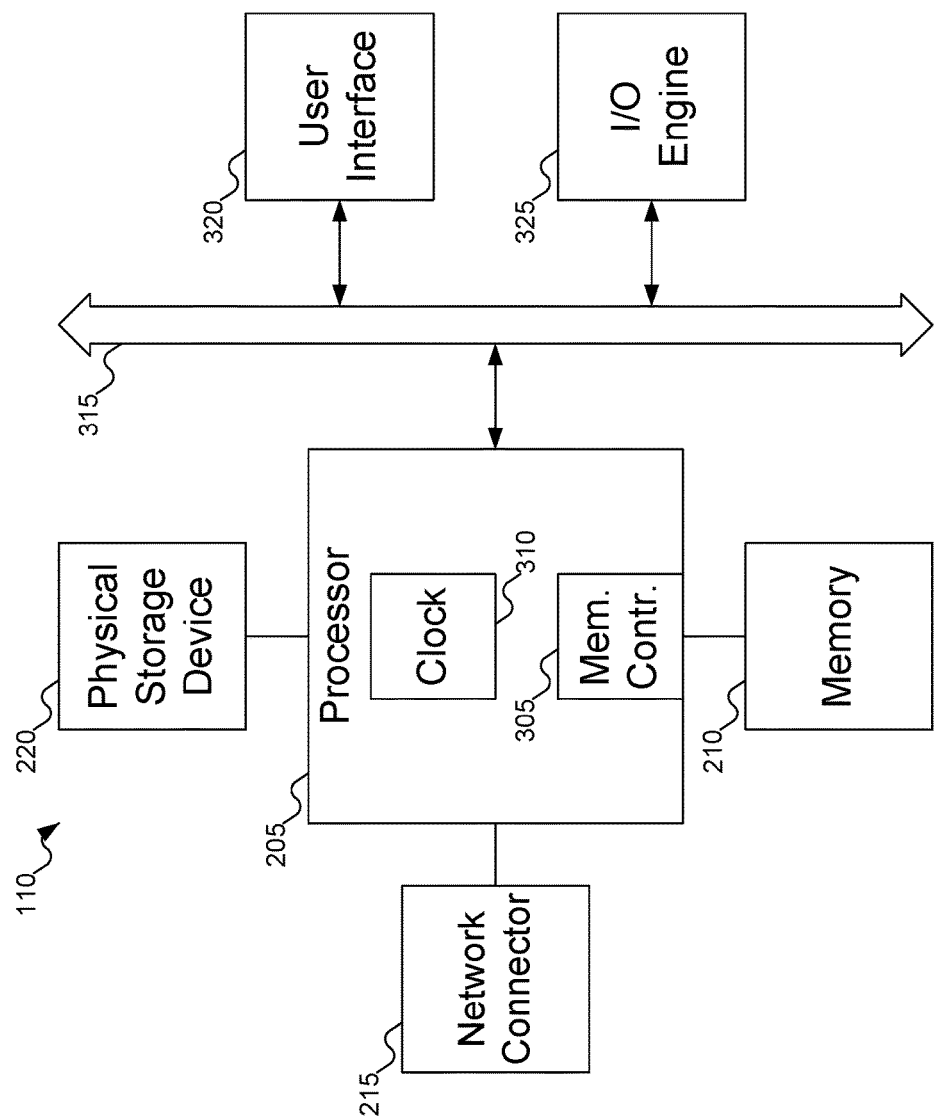
FIG. 3 shows additional details of the host machine of FIG. 1.

FIG. 3 shows additional details of host machine 110 of FIG. 1. Referring to FIG. 3, typically, machine or machines 110 include one or more processors 205, which may include memory controller 305 and clock 310, which may be used to coordinate the operations of the components of machine or machines 110. Processors 205 may also be coupled to memory 210, which may include random access memory (RAM), read-only memory (ROM), or other state preserving media, as examples. Processors 205 may also be coupled to storage devices 220, and to network connector 215, which may be, for example, an Ethernet connector or a wireless connector. Processors 205 may also be connected to a bus 315, to which may be attached user interface 320 and input/output interface ports that may be managed using input/output engine 325, among other components.

Figure 4:
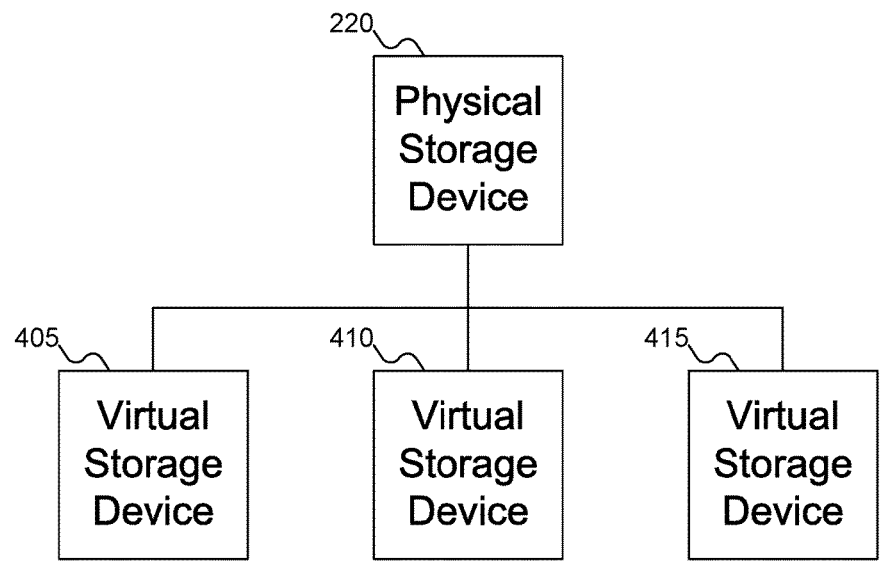
FIGS. 4-5 show different ways in which physical storage devices may support virtual storage devices.
Figure 5:
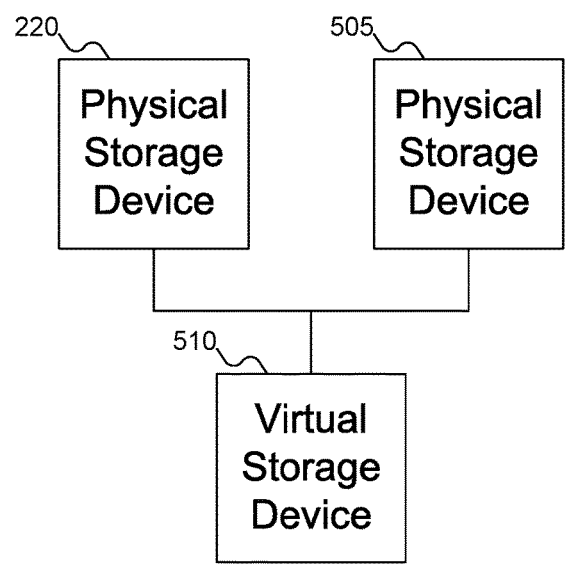

Before diving into the specifics of a storage graph/tree, it is worthwhile to examine the possible relationships between physical storage devices and virtual storage devices. (In the remainder of this document, the term "storage graph" is used, since mathematically a "tree" is a graph that meets some specific requirements, some of which might not exist in all embodiments of the inventive concept. However, the term "storage tree" may be used with the understanding that the rigorous mathematical meaning of the term "tree" might not be met.) FIGS. 4-5 show different ways in which physical storage devices may support virtual storage devices.

In FIG. 4, physical storage device 220 is shown as including three virtual storage devices 405, 410, and 415. In effect, physical storage device 220 is "divided" into three parts (not necessarily of equal size), with each part allocated for one of the virtual storage devices. Each virtual storage device 405, 410, and 415 may operate independently of each other (but obviously limited by the fact that virtual storage devices 405, 410, and 415 share the same physical storage device 220, and therefore have to share the physical resources of physical storage device 220). Each virtual storage device 405, 410, and 415 may therefore appear to host machine 110 of FIG. 1 and to any applications as a unique storage device.

While FIG. 4 shows physical storage device 220 including three virtual storage devices 405, 410, 415, embodiments of the inventive concept may support any number of virtual storage devices. This concept may specifically include a single virtual storage device, whereby the entirety of physical storage device 220 is used to store a single virtual storage device. While it might seem unnecessary to have a single physical storage device host a single virtual storage device, an advantage of doing so is that the physical storage device may, in the future, be modified to host additional virtual storage devices.

In contrast with FIG. 4, in FIG. 5 two physical storage devices 220 and 505 are shown, both hosting a single virtual storage device 510. The idea represented in FIG. 5 may be thought of as the virtual analog to an array of storage devices operating as Just a Bunch of Disks (JBOD) or Just a Bunch of Flash (JBOF). When data is to be read of written, the address of the data may be translated first to one of physical storage devices 220 and 505, and then to the physical block address on that device. By have virtual storage device 510 span multiple physical storage devices 220 and 505, virtual storage device 510 may appear to have more storage than either of physical storage devices 220 and 505 individually.

While FIG. 5 shows two physical storage devices 220 and 505 both hosting a single virtual storage device 510, embodiments of the inventive concept may support any number of physical storage devices hosting a single virtual storage device. In addition, embodiments of the inventive concept may support combinations of FIGS. 4-5, which may be described as multi-to-multi. For example, in FIG. 5, physical storage devices 220 and 505 might also each host separate virtual storage devices (providing for a total of three virtual storage devices across the two physical storage devices 220 and 505).

Figure 6:
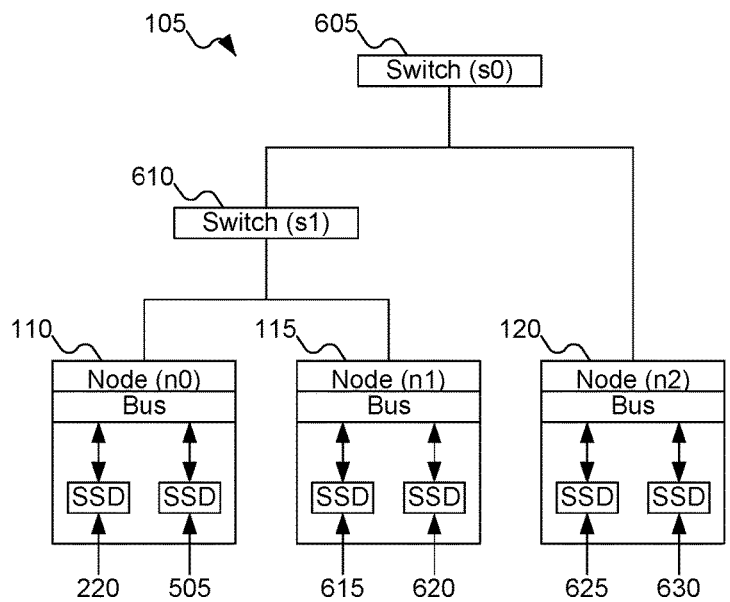
FIG. 6 shows an example system topology for the data center of FIG. 1.

FIG. 6 shows an example system topology for data center 105 of FIG. 1. In FIG. 6, data center 105 is shown as including two switches 605 and 610 and three computers 110, 115, and 120, (which may also be called "nodes", although this terminology may conflict with the use of the term "node" in a storage graph). The three computers 110, 115, and 120 themselves each may include two storage devices.

In addition to the system topology, local storage information may specify what storage devices are available within a given computer in the system topology. For example, the local storage information may specify that computer 110 includes storage devices 220 and 505, computer 115 includes storage devices 615 and 620, and computer 120 includes storage devices 625 and 630. The local storage information may also provide additional information, such as the interfaces used by the various storage devices. For example, the local storage information may specify that storage devices 220, 615, and 625 use a Peripheral Component Interconnect Express (PCIe) interface, whereas storage devices 505, 620, and 630 use a Serial Attached Small Computer System Interface (SAS).

In FIG. 6, storage devices 220, 505, 615, 620, 625, and 630 are shown as Solid State Drives (SSDs), but embodiments of the inventive concept may support any desired varieties of storage devices, including, for example, hard disk drives and tape drives, to name but a few. In addition, embodiments of the inventive concept may support mixed storage device formats. For example, one computer may include just SSDs, another computer may include just hard disk drives, a third computer may include some SSDs and some hard disk drives, and so on: all combinations of device types are within the ambit of embodiments of the inventive concept.

FIG. 6 shows two switches, three computers, and two storage devices within each computer. But embodiments of the inventive concept may support any number and mix of device types. For example, a different system topology might include only one switch, but eight computers, with each computer having between 1 and four storage devices. Yet another system topology might have a gateway, four switches, 12 computers, and a total of 30 storage devices. All variations of system topology are included in embodiments of the inventive concept. Aside from switches 605 and 610 and computers 110, 115, and 120, other components that may be included in a system topology are routers, gateways, modems, cable modems, hubs, bridges, repeaters, Wireless Access Points (WAPs), and Network Attached Storage (NAS). The links between various elements in the system topology are also considered part of the system topology.

Each component in a system topology may be assigned a device physical identifier. For example, switches 605 and 610 may be assigned identifiers s0 and s1, respectively, and nodes 110, 115, and 120 may be assigned identifiers n0, n1, and n2, respectively. For simplicity in this example, components have been assigned device physical identifiers using a letter (representing the type of device) and a number (distinguishing one component from another similar component), with the numbers being assigned sequentially. But identifiers may be assigned in any desired manner: FIG. 6 only shows one example approach to identifying components. These identifiers may be used in multi-weight edges, as described below with reference to FIG. 8.

Figure 7:
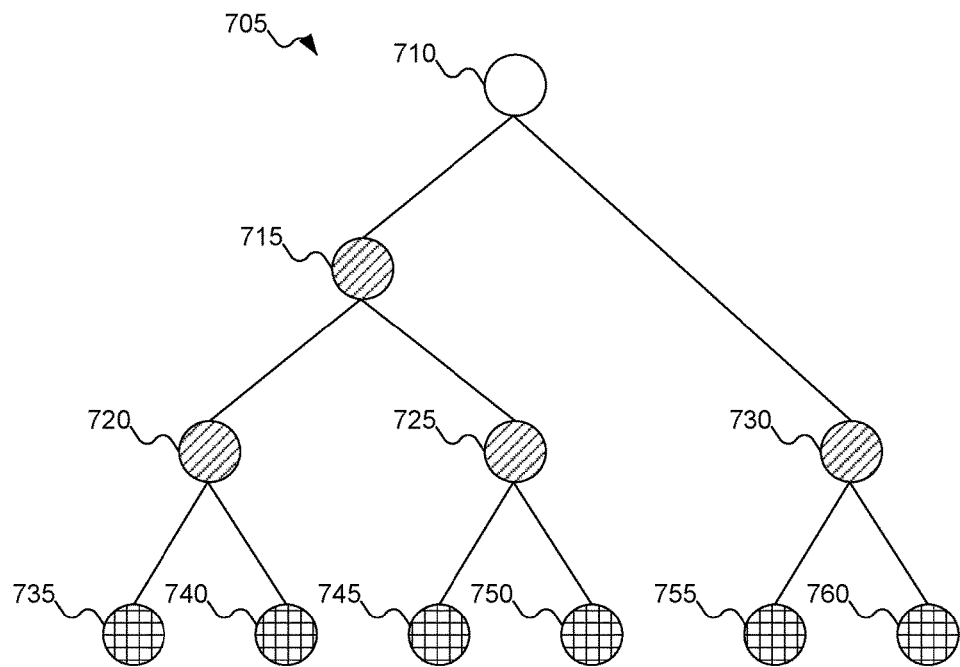
FIG. 7 shows a storage graph representing the example system topology in FIG. 6, according to an embodiment of the inventive concept.

FIG. 7 shows a storage graph representing the example system topology for data center 105 in FIG. 6, according to an embodiment of the inventive concept. In FIG. 7, storage graph 705 is shown. Each component in the system topology is represented by a node in storage graph 705, and each link between components in the system topology is represented as an edge. Thus, for example, nodes 710 and 715 correspond to switches 605 and 610, nodes 720, 725, and 730 correspond to computers 110, 115, and 120, and nodes 735, 740, 745, 750, 755, and 760 correspond to storage devices 220, 505, 615, 620, 625, and 630. In this manner, storage graph 705 models the layout of the system topology of data center 105. As the system topology varies, so too will storage graph 705 vary.

The nodes in storage graph 705 may be assigned terms that describe them. Node 710 may be called the root node of storage graph 705; nodes 715-730 may be called internal nodes of storage graph 705, and nodes 735-760 may be called leaf nodes. These concepts are more commonly associated with trees than general graphs, but their use in the context of a more general graph may still be understood. A root node is a node at the "top" of the graph; leaf nodes are nodes at the "bottom" of the graph, and internal nodes are those nodes between the root node and the leaf nodes. Viewing information flow from top to bottom (of course, data also flows in the other direction, but this fact may be ignored for the moment), root node 710 is the component of the system topology through which all data enters the system, and leaf nodes 735-760 are the ultimate destinations for such data.

Storage graph 705 is, in fact a tree, which in graph theory is defined as a graph where there is exactly one path between any two nodes in the graph. But there is no requirement that a system topology have a tree structure. For example, if computer 120 in FIG. 6 were connected to both switches 605 and 610 of FIG. 6, node 715 and 730 in storage graph 705 of FIG. 7 would also be linked. But this additional connection would mean that there are two paths between root node 710 and internal node 730: the direct path between the two nodes, and an indirect path going through internal node 715. With such a modification, storage graph 705 would no longer meet the mathematical definition of a tree. This is why, from a technical point of view, the term "graph" better fits embodiments of the inventive concept.

While FIG. 7 shows only one root node 710, embodiments of the inventive concept may support multiple root nodes. That is, a given data center might have more than one point of entry, each of which would be a root node in storage graph 705. Since trees in graph theory are typically thought of as having only one root node, this situation provides another reason why the term "graph" might be a better fit than "tree".

Note that in storage graph 705, all the leaf nodes 735-760 are storage devices. This is not a coincidence. Since storage devices 220, 505, 615, 620, 625, and 630 are the ultimate destinations for any requests (since they store whatever data might be requested or modified), data typically does not flow any further "down" storage graph 705 than leaf nodes 735-760. (Data might need to flow between storage devices, which would mean that data would flow back up and down again within storage graph 705, but that situation is different from the concept of data flowing further down.)

Figure 8:
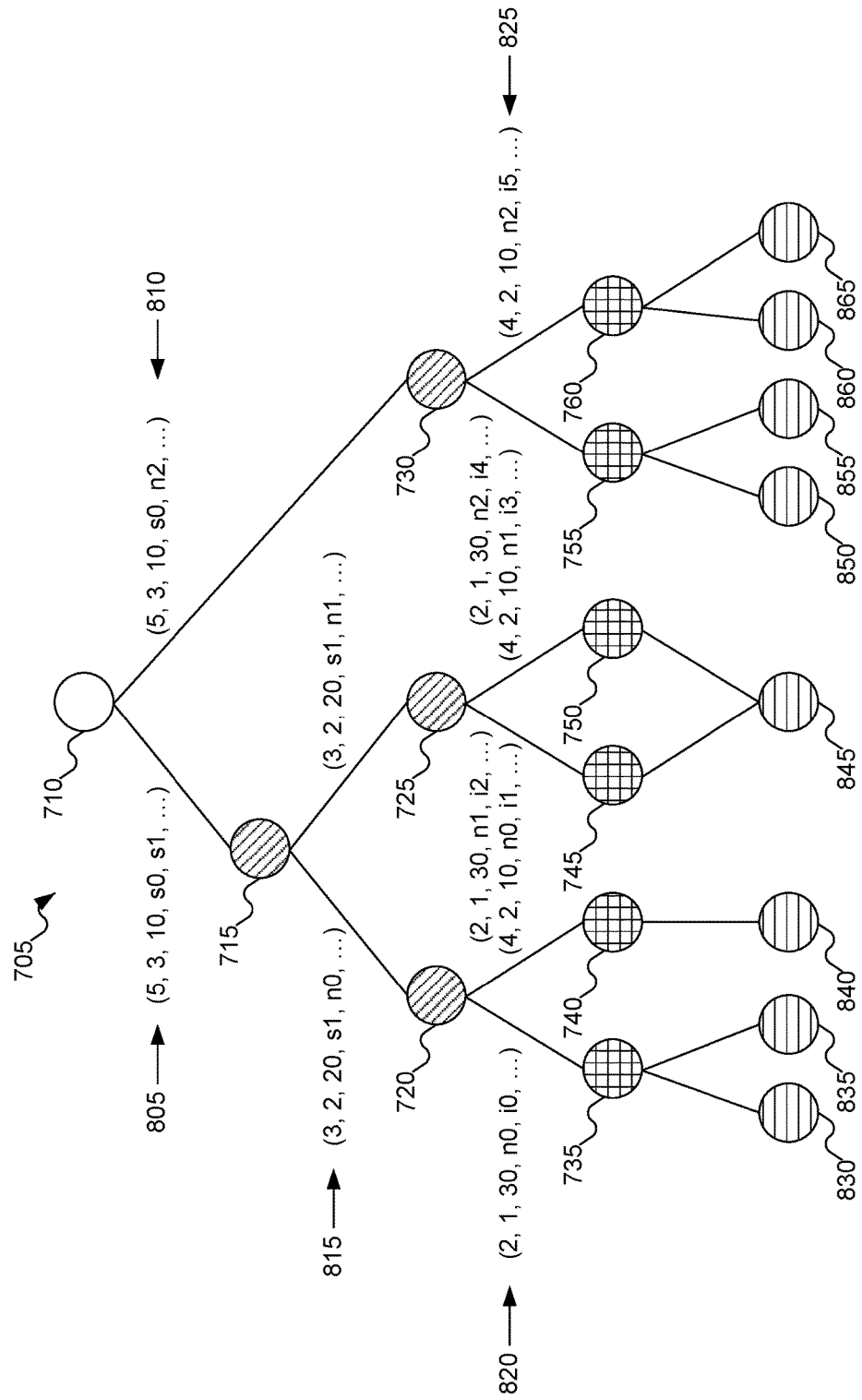
FIG. 8 shows the storage graph of FIG. 7 showing multi-weight edges and augmented to show virtual storage devices, according to an embodiment of the inventive concept.

FIG. 8 shows storage graph 705 of FIG. 7 showing multi-weight edges and augmented to show virtual storage devices, according to an embodiment of the inventive concept. In FIG. 8, the edges, such as edges 805, 810, 815, 820 and 825 (to identify a few edges) of storage graph 705 have been assigned weights, represented as tuples, which are described further below. These weights may be determined in various ways, including but not limited to the system and method described in U.S. patent application Ser. No. 15/225,811, filed Aug. 1, 2016, which claims the benefit of U.S. Provisional Patent Application Ser. No. 62/341,059, filed May 24, 2016, both of which is incorporated by reference herein for all purposes. Edges 805, 810, 815, 820 and 825 are termed "multi-weight" edges because the values in each tuple provide a variety of different ways to value the edges. For example, each multi-weight edge 805, 810, 815, 820 and 825 may include a distance, a latency, and a bandwidth, each of which represent a different method for weighting the edge. For example, when a query is concerned with bandwidth, the bandwidth measure in multi-weight edges 805, 810, 815, 820 and 825 may be considered, whereas the latency measure in multi-weight edges 805, 810, 815, 820 and 825 may be considered when the query concerns latency.

The distance value in multi-weight edges 805, 810, 815, 820 and 825 provides an alternative mechanism for measuring the weight of multi-weight edges 805, 810, 815, 820 and 825. But rather than representing the physical distance between the components in data center 105 of FIG. 6, "distance" is a more abstract concept. Latency and distance may be directly correlated: that is, there may be a function that maps a distance value to a corresponding latency value. There may also be a correlation between distance and other coordinates multi-weight edges 805, 810, 815, 820 and 825, such as bandwidth.

Thus, for example, multi-weight edges 805 and 810 have a distance of 5, a latency of 3, and a bandwidth of 10; multi-weight edge 815 has a distance of 3, a latency of 2, and a bandwidth of 20, and so on. These values are presented without units because any scale of units may be used (although all corresponding values in the multi-weight edges should use the same units). For example, latency may be a measure of how long it takes for data to be returned after a read request, and could be measured in milliseconds, microseconds, nanoseconds, or any other desired unit of time. Similarly, bandwidth may be a measure of how much data may be transmitted in a unit amount of time, and could be measured in kilobytes per second, megabytes per second, gigabytes per second, or any other desired measurement.

Multi-weight edges 805, 810, 815, 820 and 825 may also include identifiers, such as device physical identifiers and/or device interface identifiers. These identifiers may help to identify exactly which components in data center 105 of FIG. 6 are connected by that edge. For example, refer briefly back to FIG. 6. There is cabling between switch 605 and switch 610, and between switch 610 and computer 110. In addition, computer 110 includes storage devices 220 and 505.

When an edge represents physical cabling between components, the device physical identifiers are enough to uniquely identify the edge. For example, the edge connecting switch 605 and 610 may be uniquely identified by the device physical identifiers of these components. But while storage devices 220 and 505 are assigned their own nodes within storage graph 705, they are not separate components in data center 105 of FIG. 6: they are both part of computer 110. Thus, relying solely on device physical identifiers would leave some confusion: does the device physical identifier for computer 110 identify the computer itself, or does it identify one of storage devices 220 and 505?

By using both a device physical identifier and a device interface identifier, the ambiguity may be resolved. As with the physical components, device interfaces may be assigned unique identifiers. Returning to FIG. 8, device interfaces may be identified using a letter to indicate that the identifier is for a device interface and a number to uniquely identify the device interface. For example, consistent with the discussion above with reference to FIG. 6, device interfaces i0, i2, and i4 might be PCIe interfaces, whereas device interfaces i1, i3, and i5 might be SAS device interfaces.

Note that the above discussion suggests that the same device interface on a different node may be assigned a different device interface identifier. Such a scheme provides a quick way to uniquely identify a device interface. If it might be guaranteed that a particular node only has one storage device connected via any particular device interface, the same device interface identifiers might be used across different nodes. But because a node might include multiple storage devices using the same device interface, such a scheme for assigning identifiers to device interfaces might not provide a unique device interface identifier. For example, SAS may support up to 128 different storage devices. If all of these storage devices were assigned the same device interface, the system would have no way to determine exactly which storage device is identified.

Thus, multi-weight edge 805 may include identifiers s0 and s1, indicating that multi-weight edge 805 connects switches 605 and 610 of FIG. 6. Similarly, multi-weight edge 810 may include identifiers s0 and n2, indicating that multi-weight edge 810 connects switch 605 and computer 120 of FIG. 6. In contrast, multi-weight edge 820 may use n0—the device physical identifier for computer 110 of FIG. 6—and i0—the device interface identifier for the interface used by storage device 220 of FIG. 2. This combination of device physical identifier and device interface identifier may uniquely identify the elements in the system topology of data center 105 in FIG. 6 that are connected by the edge in question in storage graph 705. Similarly, multi-weight edge 825 may use n2—the device physical identifier for computer 120 of FIG. 6—and i5—the device interface identifier for storage device 630 of FIG. 6. And so on.

FIG. 8 also shows a number of nodes representing virtual storage devices. Specifically, storage graph 705 is shown as including nodes 830, 835, 840, 845, 850, 855, 860, and 865. These leaf nodes (whose inclusion has the incidental effect of making nodes 735-760 internal nodes) may represent different virtual storage devices. Note that node 735 has two child nodes 830 and 835, node 740 has one child node 840, nodes 745 and 750 share a single child node 845, node 755 has two child nodes 850 and 855, and node 760 has two child nodes 860 and 865. (Note that the inclusion of the merged virtual storage machine represented by node 845 means that storage graph 705 does not meet the mathematical definition of a tree.) As a result, storage graph 705 of FIG. 8 shows three of the four possible relationships between physical storage devices and virtual storage devices, as described above with reference to FIGS. 4-5.

Note that physical storage device 740 includes only one virtual storage device 840. The question might arise why a physical storage device might include only one virtual storage device: wouldn't it be simpler to just directly access the physical storage device? The answer is that the physical storage device may be directly accessed, without using a virtual storage device. But by including a virtual storage device even when the entire physical storage device is used would be consistent with other physical storage devices that are not in a one-to-one relationship with a virtual storage device. In addition, if at some later point it would be desirable to use the physical storage device in some other relationship with one or more virtual storage devices, the existing virtual storage device is already established within the storage graph.

FIG. 7 shows only physical storage devices as leaf nodes; FIG. 8 shows only virtual storage devices as leaf nodes. Embodiments of the inventive concept may support either case, as well as mixed cases: that is, storage graphs may use both physical storage devices and virtual storage devices as leaf nodes, as the case may be.

Client machine 140 of FIG. 1 does not know or care whether data center 105 of FIG. 1 uses virtual storage devices. Thus, when virtual storage devices are used, and more particularly when merged virtual storage devices (such as the one represented by node 845) are used, from the perspective of client machine 140 of FIG. 1, the merged virtual storage device appears just like any other storage device. Client machine 140 of FIG. 1 would then be interested in the latency, bandwidth, and other properties of the merged virtual storage device.

Figure 9:
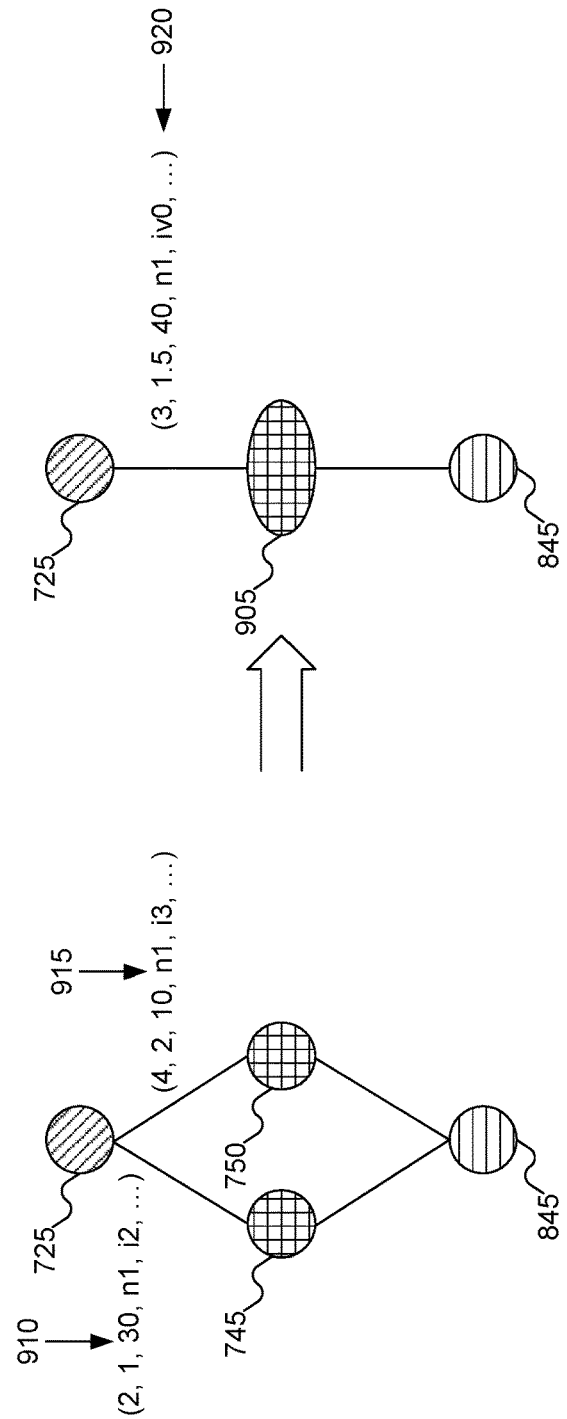
FIG. 9 shows the aggregation of multi-weight edges and nodes for a merged virtual storage device spanning multiple physical storage devices in the storage graph of FIG. 8.

To determine the properties of the merged virtual storage device, the multi-weight edges that lead to the nodes in the merged virtual storage device may be aggregated. FIG. 9 shows the aggregation of multi-weight edges and nodes for a merged virtual storage device spanning multiple physical storage devices in storage graph 705 of FIG. 8. Nodes 745 and 750 may be replaced with merged node 905, and multi-weight edges 910 and 915 may be aggregated to form aggregate multi-weight edge 920. In aggregate multi-weight edge 920, the distance may be calculated as the arithmetic mean of the distances in multi-weight edges 910 and 915. Similarly, the latency in aggregate multi-weight edge 920 may be calculated as the arithmetic mean of the latencies in multi-weight edges 910 and 915. Finally, the bandwidth in aggregate multi-weight edge 920 may be calculated as the sum of the bandwidths in multi-weight edges 910 and 915. The distance, latency, and bandwidth in aggregate multi-weight edge 920 may be calculated as straight means and sums of the various values from multi-weight edges 910 and 915, or they may be calculated as weighted means and sums. Using weighted means and sums might provide a more accurate picture where various storage devices (virtual or physical) have disproportionate loads: weighting the values for storage devices that have a higher load might more accurately reflect the effective operation of the merged virtual storage device.

The device physical identifier for aggregate multi-weight edge 920 may be the same as the device physical identifiers for multi-weight edges 910 and 915. But node 845 representing the merged virtual storage device may include devices with many different interfaces, a new interface (a virtual interface) may be used for the device interface identifier in aggregate multi-weight edge 920. Thus, multi-weight edge 920 uses a device interface identifier of iv0, identifying a particular virtual interface for node 845.

Figure 10:
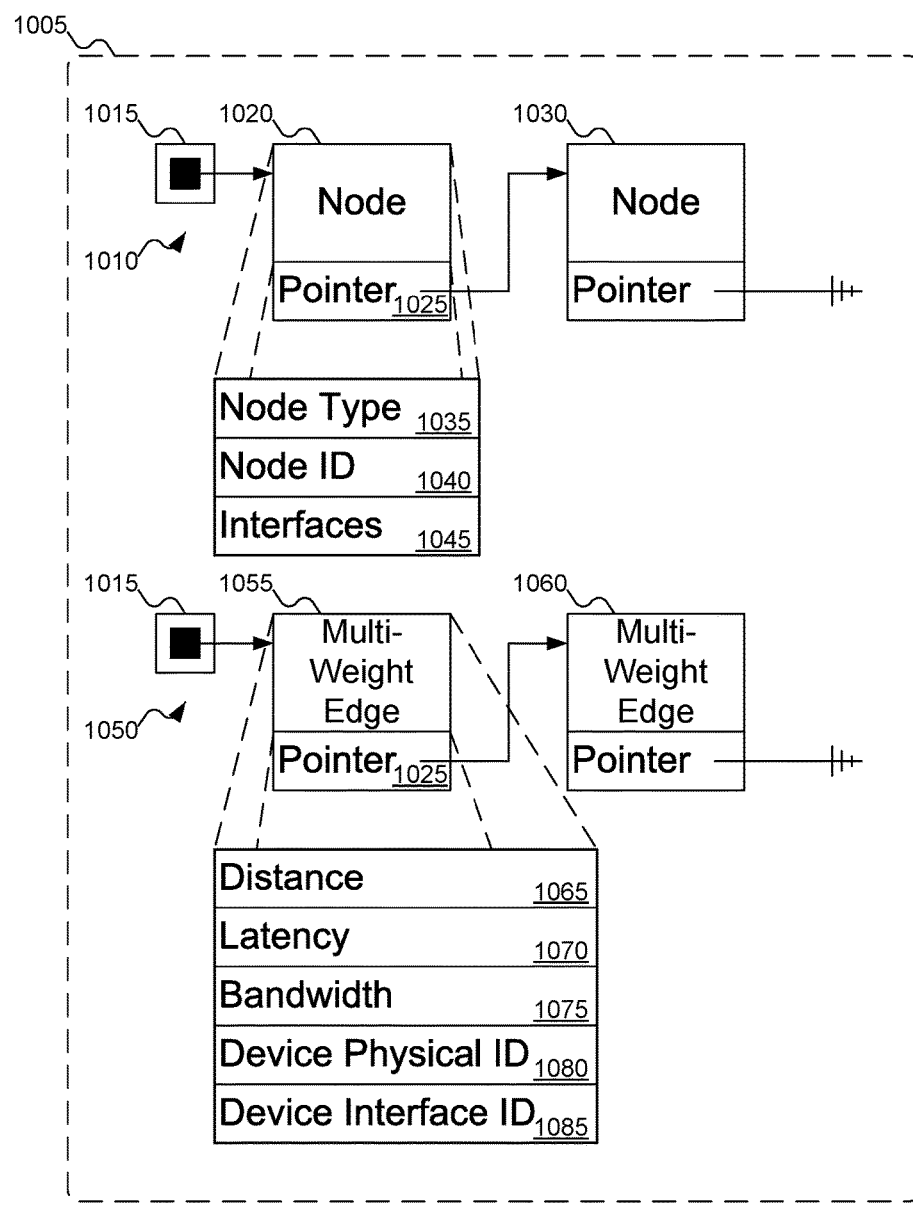
FIG. 10 shows a data structure for storing the storage graph of FIGS. 7-9.

FIG. 10 shows a data structure for storing storage graph 705 of FIGS. 7-9. In FIG. 10, data structure 1005 is shown using linked lists, but embodiments of the inventive concept may support any data structure to store storage graph 705 of FIGS. 7-9: for example, array data structures. Data structure 1005 may be stored, for example, in storage 225 of FIG. 2.

Data structure 1005 may include node linked list 1010. Node linked list 1010 may include header pointer 1015, which may point to node 1020. Another pointer 1025 may point to another node 1030, and so on. While FIG. 10 shows node linked list 1010 with only two nodes, embodiments of the inventive concept may support any number of nodes in node linked list 1010.

Each node in node linked list 1010 may store information, such as node type 1035, node identifier 1040, and interfaces 1045. Node type 1035 may specify whether the node in question represents a switch, computer, storage device, or any other component in a system topology. Node identifier 1040 may specify a unique identifier for the node in system graph 705 of FIGS. 7-9. And interfaces 1045 may specify what interfaces are available within that node, for other components to connect to. Interfaces 1045 itself may be stored as an array or another linked list, among other possible data structures.

Data structure 1005 may also include multi-weight edge linked list 1050. Multi-weight edge linked list 1050 may include header pointer 1055, which may point to multi-weight edge 1055. Another pointer 1025 may point to another multi-weight edge 1060, and so on. While FIG. 10 shows multi-weight edge linked list 1050 with only two multi-weight edges, embodiments of the inventive concept may support any number of multi-weight edges in multi-weight edge linked list 1050.

Each multi-weight edge in multi-weight edge linked list 1050 may store information, such as distance 1065, latency 1070, bandwidth 1075, device physical identifier 1080, and device interface identifier 1085, as described above with reference to FIG. 8.

Figure 11:
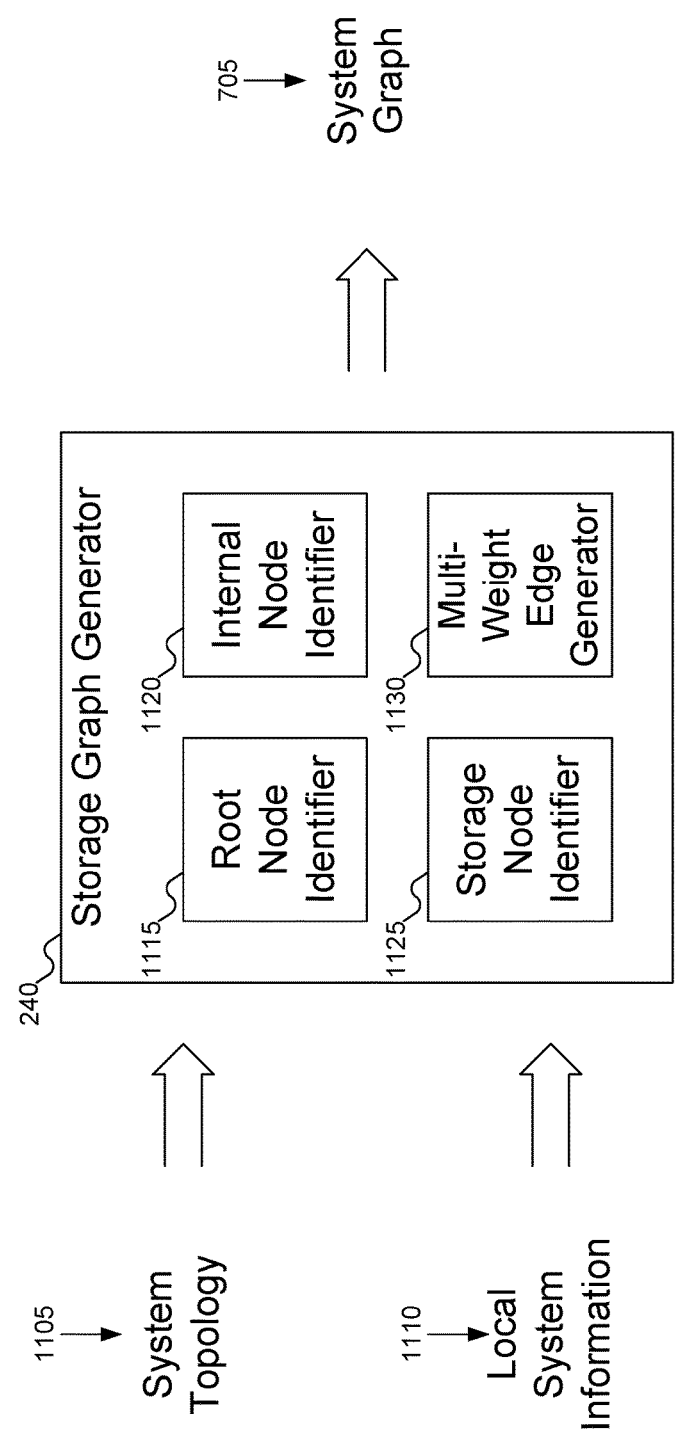
FIG. 11 shows details of the storage graph generator of FIG. 2.

FIG. 11 shows details of storage graph generator 240 of FIG. 2. In FIG. 11, storage graph generator 240 may receive system topology 1105 and local storage information 1110 as inputs. System topology 1105 may be a complete system topology for data center 105 of FIG. 1 or a partial system topology (since even partial information may be useful). Similarly, local storage information 1110 may be complete or partial. Storage graph generator 240 may then produce system graph 705 as an output.

Storage graph generator 240 may include root node identifier 1115, internal node identifier 1120, storage node identifier 1125, and multi-weight edge generator 1130. Root node identifier 1115, internal node identifier 1120, and storage node identifier 1125 may identify which components within system topology 1105 and local storage information 1110 represent root nodes, internal nodes, and nodes representing storage devices (either physical or virtual) in system graph 705. Note that leaf nodes in storage graph 705 are typically storage devices, but storage devices might also be internal nodes in storage graph 705. For example, where virtual storage devices are leaf nodes in storage graph 705, the physical storage device embodying the virtual storage device, although a storage device, is an internal node in storage graph 705.

Multi-weight edge generator 1130 may determine the values stored in the multi-weight edge tuples. Distances 1065, latencies 1070, and bandwidths 1075, all of FIG. 10, in the multi-weight edge tuples may be determined in any desired manner: for example, using the system and method described in U.S. patent application Ser. No. 15/225,81, filed Aug. 1, 2016, which claims the benefit of U.S. Provisional Patent Application Ser. No. 62/341,059, filed May 24, 2016, both of which is incorporated by reference herein for all purposes. Device physical identifier 1080 and device interface identifier 1085, both of FIG. 10, may be determined from system topology 1105 and local storage information 1110.

Figure 12:
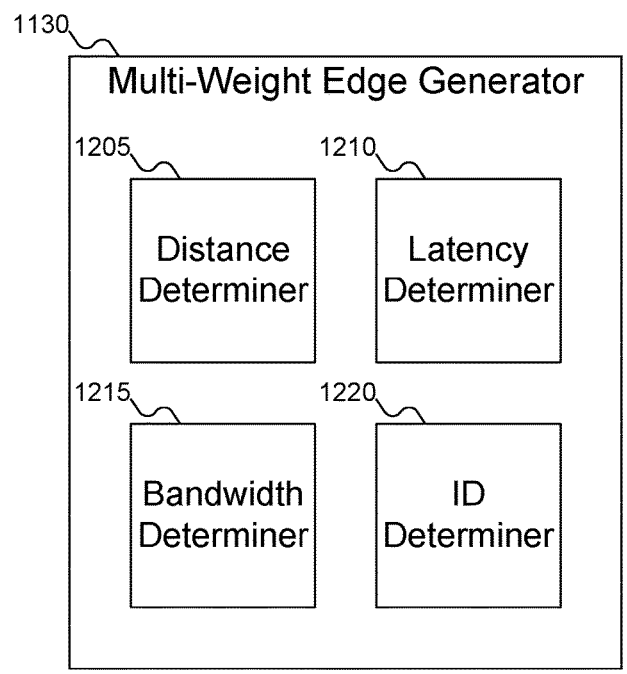
FIG. 12 shows details of the multi-weight edge generator of FIG. 11.

FIG. 12 shows details of multi-weight edge generator 1130 of FIG. 11. In FIG. 12, multi-weight edge generator 1130 may include distance determiner 1205, latency determiner 1210, bandwidth determiner 1215, and identifier determiner 1220. Distance determiner 1205 may determine the distance between the two nodes connected by the multi-weight edge; latency determiner 1210 may determine the latency between the two nodes connected by the multi-weight edge; and bandwidth determiner 1215 may determine the bandwidth between the two nodes connected by the multi-weight edge. Distance determiner 1205, latency determiner 1210, bandwidth determiner 1215 may operate in any desired manner to determine distance 1065, latency 1070, and bandwidth 1075, all of FIG. 10. For example, latency determiner 1210 may measure the time interval from when a request is sent from the parent node to the child node and when the child node responds that the request has completed. Or, bandwidth determiner 1215 may request that a large block of data be sent from the child node to the parent node, measure how long it takes until the parent node receives the data, and then calculate the bandwidth as the ratio of the size of the block relative to the time required to send the data. In other embodiments of the inventive concept, distance determiner 1205, latency determiner 1210, bandwidth determiner 1215 may use the system and method described in U.S. patent application Ser. No. 15/225,811, filed Aug. 1, 2016, which claims the benefit of U.S. Provisional Patent Application Ser. No. 62/341,059, filed May 24, 2016, both of which is incorporated by reference herein for all purposes. Identifier determiner 1220 may determine device physical identifier 1080 and device interface identifier 1085, both of FIG. 10, from an examination of storage topology 1105 and/or local storage information 1110, both of FIG. 11.

Figure 13:
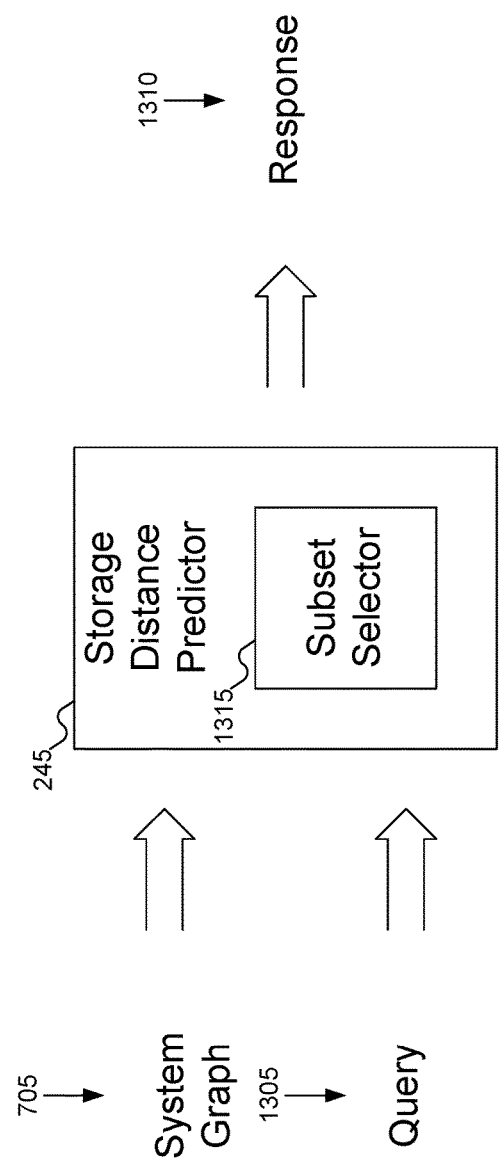
FIG. 13 shows details of the storage distance predictor of FIG. 2.

FIG. 13 shows details of storage distance predictor 245 of FIG. 2. In FIG. 13, storage distance predictor may receive system graph 705 and query 1305 as input, and may produce response 1310 as output. Storage distance predictor 245 may include subset selector 1315, which may select a subset of leaf nodes in storage graph 705 that may satisfy query 1305. But before addressing how subset selector 1315 may operate, it is helpful to understand what queries 1305 may be submitted to storage distance predictor 245.

Figure 14:
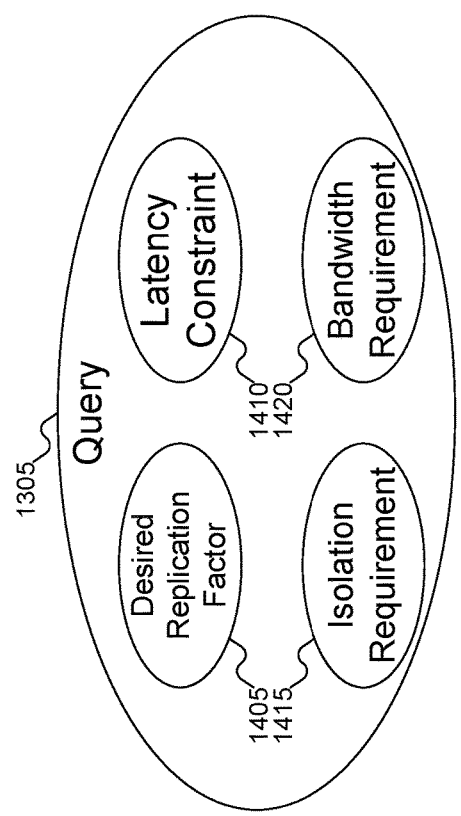
FIG. 14 shows various queries that may be submitted to the storage distance predictor of FIG. 2.

FIG. 14 shows various queries 1305 that may be submitted to storage distance predictor 245 of FIG. 2. These queries 1305 may include desired replication factor 1405, latency constraint 1410, isolation requirement 1415, and bandwidth requirement 1420. Desired replication factor 1405 may specify a desired degree of replication to be used by an application. Desired replication factor 1405 may also be called a degree of parallelism. For example, an application might specify that at least three different leaf nodes in storage graph 705 of FIGS. 7-9 should be used to store the application's data. Latency constraint 1410 may specify that the maximum latency that an application will tolerate. Isolation requirement 1415 may specify that the application expects its data to be isolated from one or more other specified applications. Bandwidth requirement 1420 may specify a minimum aggregate bandwidth for the selected virtual storage devices.

Queries 1305 may be specified individually or in combination. For example, an application might want a desired replication factor 1405 of three and a latency constraint 1410 of 10, with isolation from a specified other application. Embodiments of the inventive concept may support other combinations of queries 1305 as well.

Returning to FIG. 13, now that specifics about queries 1305 have been described, the operation of subset selector 1315 may be explained. The operation of subset selector 1315 may depend on query 1305. When query 1305 specifies desired replication factor 1405 of FIG. 14, subset selector 1315 may select a subset of the physical and/or virtual storage devices that provides the desired replication factor 1405 of FIG. 14. When query 1305 specifies latency constraint 1410 of FIG. 14, subset selector 1315 may select a subset of the physical and/or virtual storage devices that provides a maximum overall latency, between any two pairs of physical and/or virtual storage devices, that is no greater than latency constraint 1410 of FIG. 14. When query 1305 specifies isolation requirement 1415 of FIG. 14, subset selector 1315 may select a subset of the physical and/or virtual storage devices such that no selected physical and/or virtual storage device shares a physical storage device with one or more specified applications. And when query 1305 specifies bandwidth requirement 1420 of FIG. 14, subset selector 1315 may select a subset of the physical and/or virtual storage devices such that their aggregate bandwidth exceeds bandwidth requirement 1420. FIGS. 15A-15B and 16A-16B may illustrate examples of these situations.

Figure 15A:
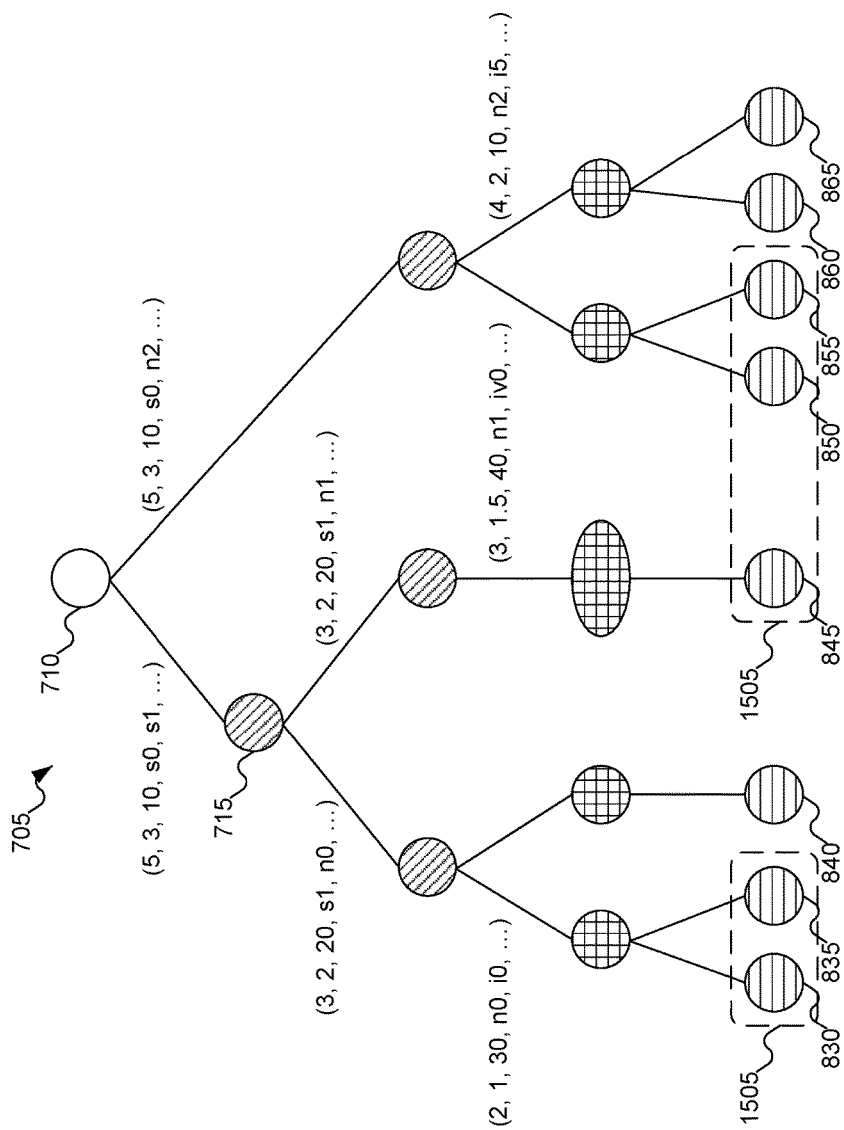
FIGS. 15A-15B show an example selection of a subset of the virtual storage devices in the storage graph of FIG. 8 to satisfy a desired replication factor and a latency constraint.
Figure 15B:
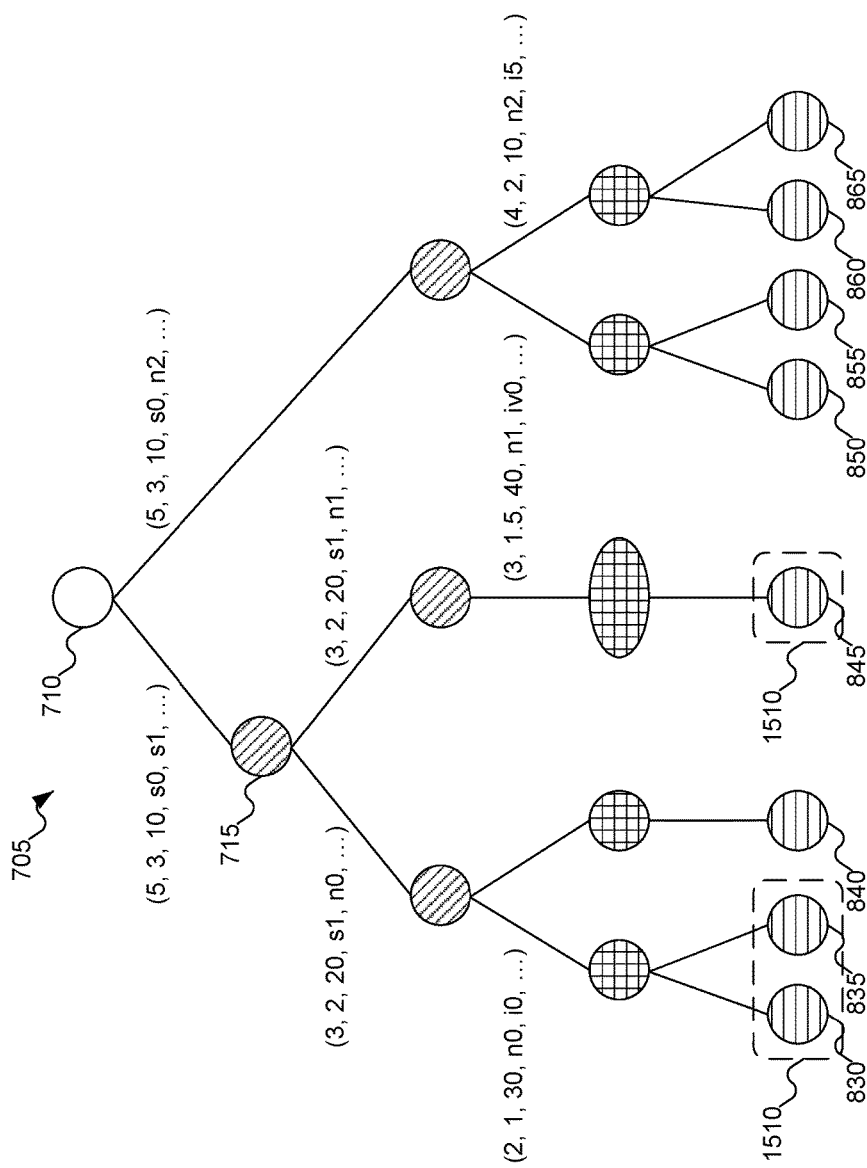

FIGS. 15A-15B show an example selection of a subset of the virtual storage devices in storage graph 705 of FIG. 8 to satisfy a desired replication factor and a latency constraint. In FIG. 15A, assume that query 1305 of FIG. 13 requested desired replication factor 1405 of FIG. 14 of three, with latency constraint 1410 of FIG. 14 of 7. Any desired algorithm may be used to select the subset of the virtual storage devices, such as arbitrarily trying combinations of storage devices until query 1305 of FIG. 13 is satisfied. But more considered approaches are possible as well.

For example, assume that an initial choice of virtual storage devices is shown as subset 1505 of FIG. 15A. Subset 1505 includes virtual storage devices 830, 835, 845, 850, and 855. But by summing the latencies between virtual storage device 830 and 855, subset selector 1315 of FIG. 13 may determine that it is not possible to select virtual storage devices on both sides of node 710. Therefore, only the subtree rooted at node 715 should be considered to satisfy latency requirement 1410 of FIG. 14: all other subtrees that connect to node 715 via node 710 may be pruned. As a result, the final subset selection may be subset 1510, as shown in FIG. 15B. Three storage devices 830, 835, and 845 are selected, satisfying desired replication factor 1405 of FIG. 14, and the maximum latency between any pair of virtual storage devices is 6.5, satisfying latency constraint 1410 of FIG. 14.

Figure 16A:
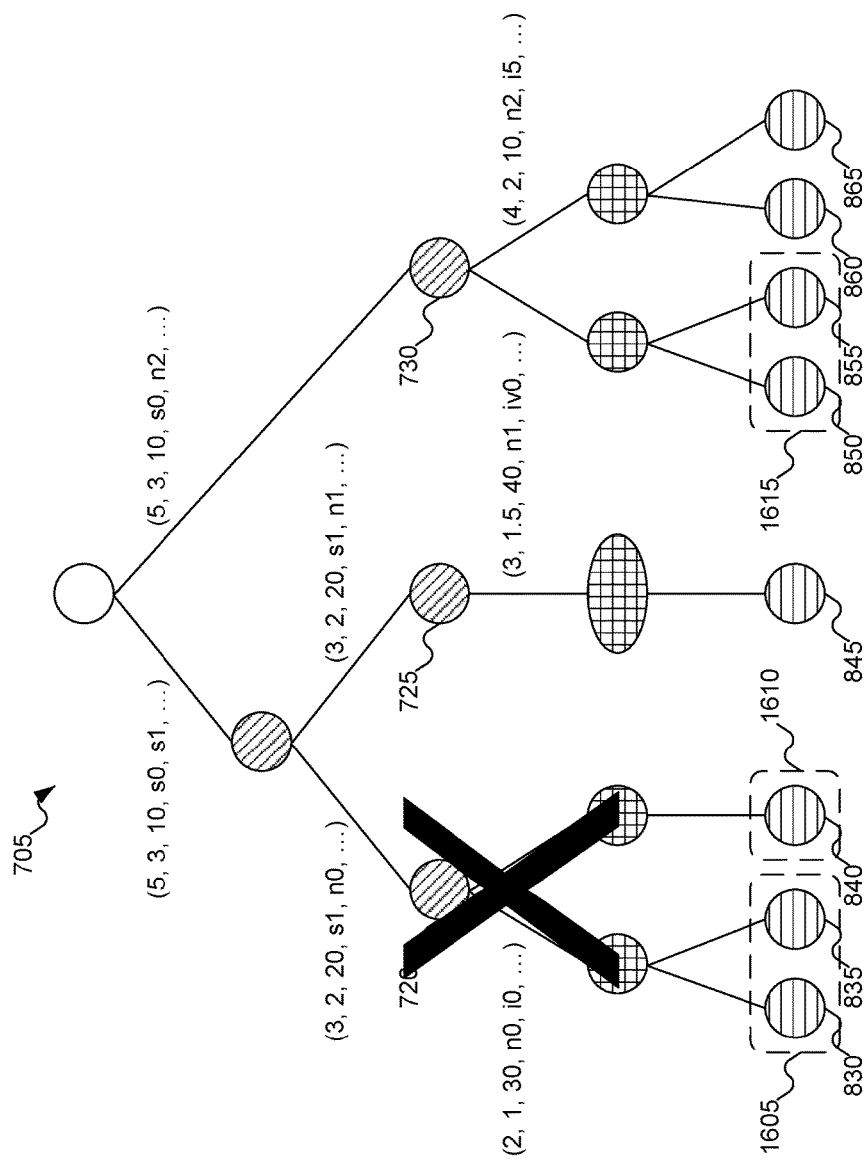
FIGS. 16A-16B show an example selection of a subset of the virtual storage devices in the storage graph of FIG. 8 to satisfy a desired isolation requirement.
Figure 16B:
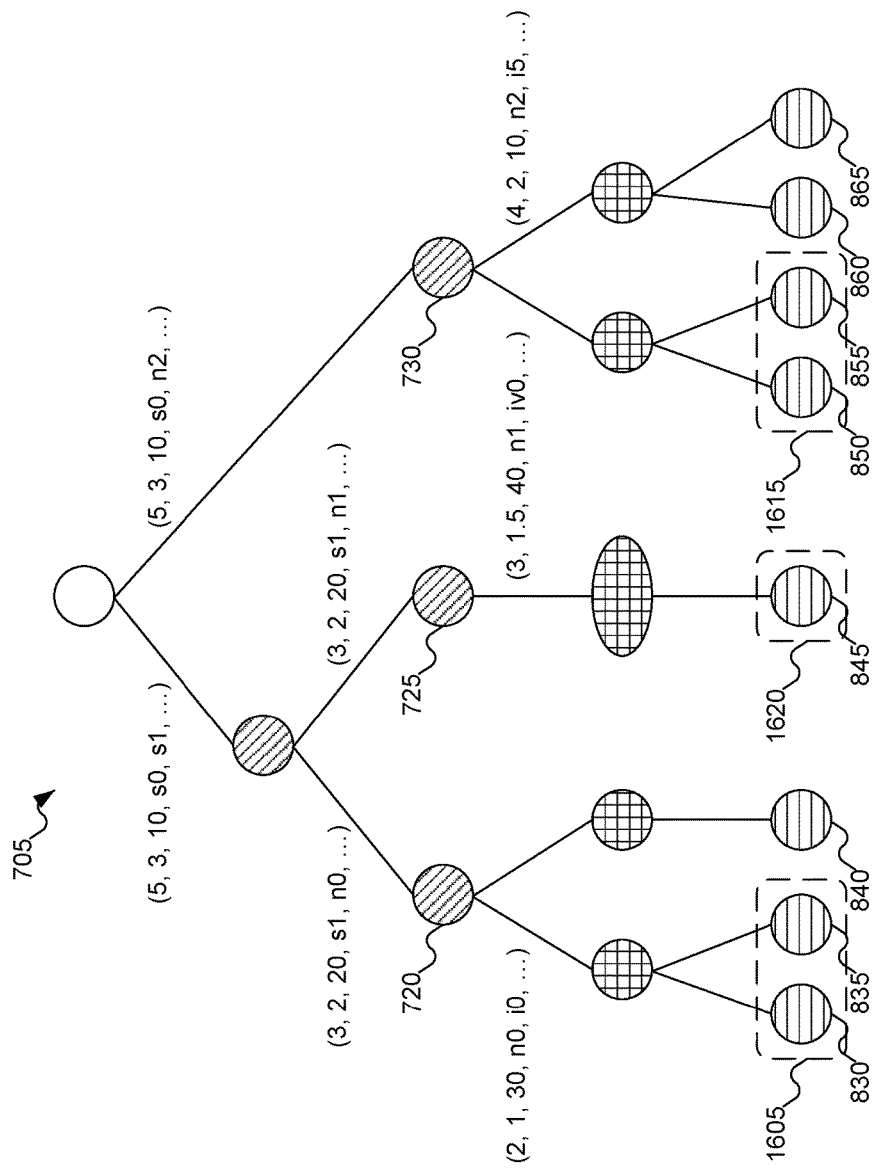

FIGS. 16A-16B show an example selection of a subset of the virtual storage devices in storage graph 705 of FIG. 8 to satisfy a desired isolation requirement. In FIG. 16A, application a1 has been assigned subset 1605, including virtual storage devices 830 and 835; application a2 has been assigned subset 1610, including virtual storage device 840; and application a3 has been assigned subset 1615, including virtual storage devices 850 and 855. Query 1305 may now specify isolation requirement 1415 of FIG. 14, indicating that application a2 should not share a storage node with application a1. Since subsets 1605 and 1610 are both within node 720, they currently share a storage node. Since this is contrary to isolation requirement 1415 of FIG. 14, a new subset of virtual storage devices needs to be selected for application a2.

Subset selector 1315 of FIG. 13 may determine that node 725 currently is not providing storage for any applications. Since node 725 does not share storage with application a1, subset selector 1315 of FIG. 13 may select virtual storage device 845 to provide storage for application a2, and the data of application a2 may then be migrated to subset 1620.

Note that in this example, isolation requirement 1415 of FIG. 14 only specified that application a2 should be isolated from application a1. Therefore, in theory any virtual storage devices on node 730 could also have been selected. But if isolation requirement 1415 of FIG. 14 had specified that application a2 be isolated from both applications a1 and a3, then node 725 (and virtual storage device 845) would have been the only available choice.

Figure 17:
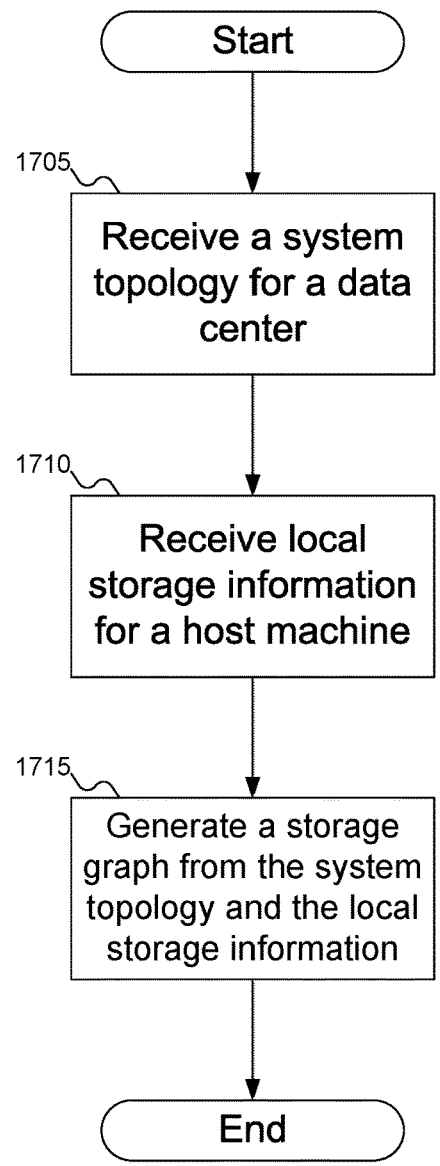
FIG. 17 shows a flowchart of an example procedure for generating the storage graph of FIGS. 7-9 from the system topology of FIG. 6 and local storage information, according to an embodiment of the inventive concept.

FIG. 17 shows a flowchart of an example procedure for generating storage graph 705 of FIGS. 7-9 from system topology 1105 of FIGS. 6 and 11 and local storage information 1110 of FIGS. 6 and 11, according to an embodiment of the inventive concept. In FIG. 17, at block 1705, storage graph generator 240 of FIG. 2 may receive system topology 1105 of FIG. 11. At block 1710, storage graph generator 240 of FIG. 2 may receive local storage information 1110 of FIG. 11. At block 1715, storage graph generator 240 may generate storage graph 705 of FIGS. 7-9 from system topology 1105 of FIG. 11 and local storage information 1110 of FIG. 11.

Figure 18A:
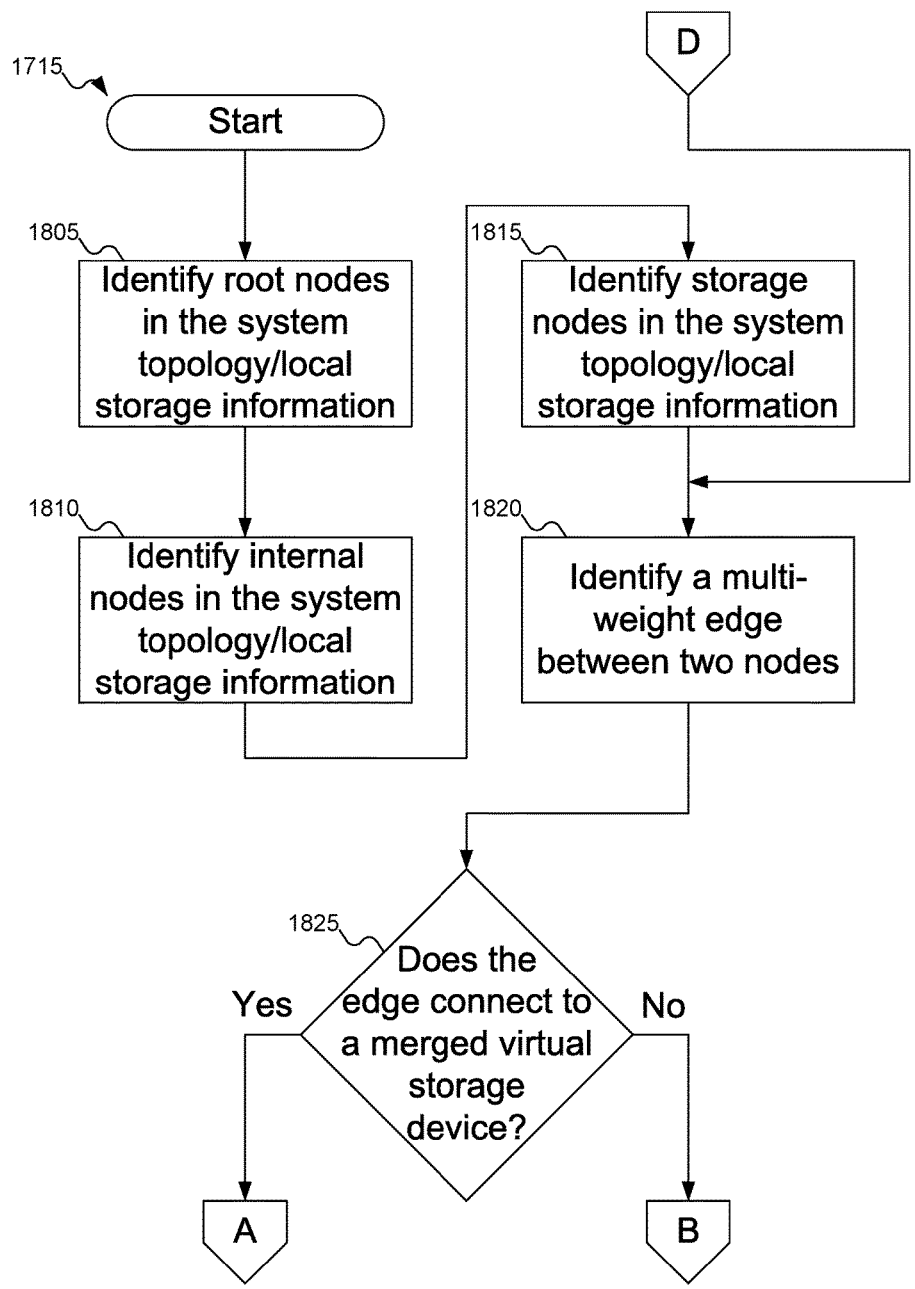
FIGS. 18A-18C show a flowchart of an example procedure for identifying nodes and multi-weight edges in the storage graph of FIGS. 7-9, according to an embodiment of the inventive concept.
Figure 18B:
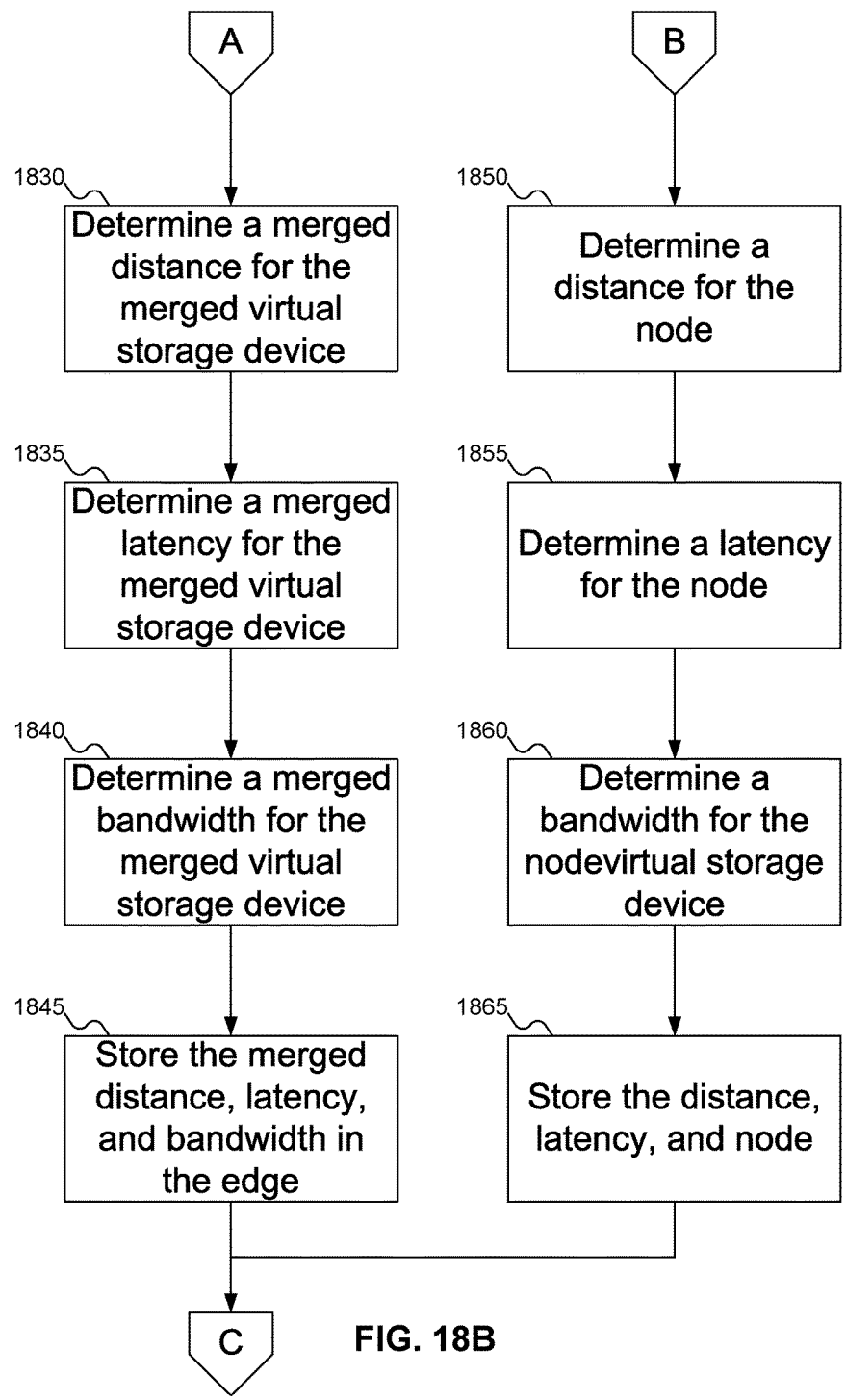
Figure 18C:
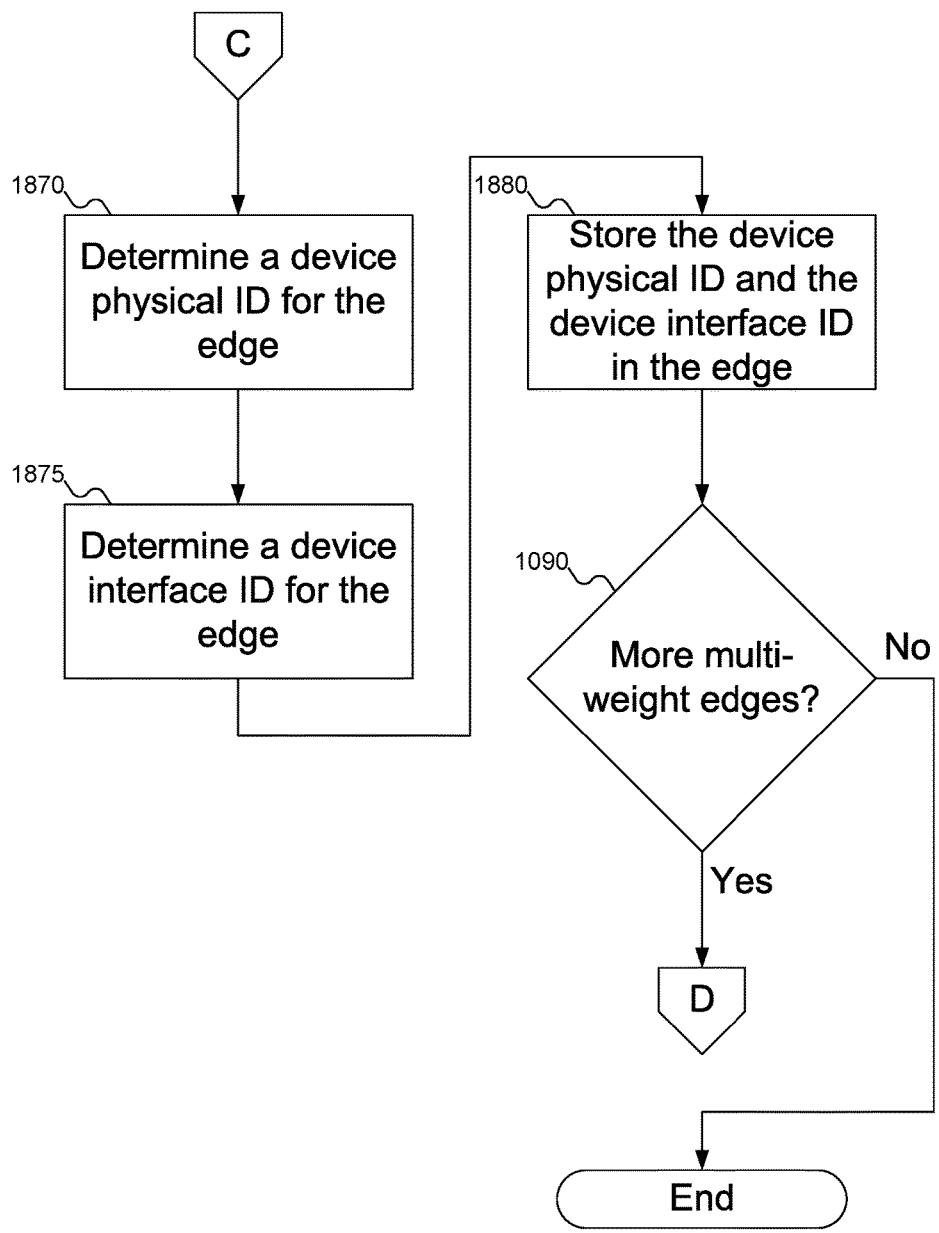

FIGS. 18A-18C show a flowchart of an example procedure for identifying nodes and multi-weight edges in storage graph 705 of FIGS. 7-9, according to an embodiment of the inventive concept. In FIG. 18A, at block 1805, root node identifier 1115 of FIG. 11 may identify one or more root nodes in system topology 1105 of FIG. 11 and local storage information 1110 of FIG. 11. Often, root nodes will be nodes that connect data center 105 of FIG. 1 to the outside world (such as client machine 140 of FIG. 1). At block 1810, internal node identifier 1120 of FIG. 11 may identify one or more internal nodes in system topology 1105 of FIG. 11 and local storage information 1110 of FIG. 11. In practice, it might be easier to identify the leaf nodes first, as any nodes that are neither root nodes nor leaf nodes will be internal nodes. But in most cases, all components that do not connect to the outside world and are not storage devices (physical or virtual, depending on which are considered to be leaf nodes) are internal nodes. At block 1815, storage node identifier 1125 of FIG. 11 may identify one or more nodes in system topology 1105 of FIG. 11 and local storage information 1110 of FIG. 11 that represent storage devices (either physical or virtual).

At this point, the nodes in storage graph 705 of FIGS. 7-9 have all been identified, so processing turns to producing the multi-weight edges. At block 1820, multi-weight edge generator 1130 of FIG. 11 of FIG. 2 may identify an edge between two nodes in storage graph 705 of FIGS. 7-9. At block 1825, multi-weight edge generator 1130 of FIG. 11 may determine whether the multi-weight edge connects to a merged virtual storage device.

If the multi-weight edge connects to a merged virtual storage node, then at block 1830 (FIG. 18B), distance determiner 1205 of FIG. 12 may determine merged distance 1065 of FIG. 10 for the merged virtual storage device, from the links to the various storage devices that composite the merged virtual storage device. At block 1835, latency determiner 1210 of FIG. 12 may determine merged latency 1070 of FIG. 10 for the merged virtual storage device, from the links to the various storage devices that composite the merged virtual storage device. At block 1840, bandwidth determiner 1215 of FIG. 12 may determine merged bandwidth 1075 of FIG. 10 for the merged virtual storage device, from the links to the various storage devices that composite the merged virtual storage device. And at block 1845, multi-weight edge generator 1130 of FIG. 11 may store merged distance 1065 of FIG. 10, merged latency 1070 of FIG. 10, and merged bandwidth 1085 of FIG. 10 in the multi-weight edge.

On the other hand, if the multi-weight edge does not connect to a merged virtual storage device, then at block 1850 distance determiner 1205 of FIG. 12 may determine distance 1065 of FIG. 10 for the node. At block 1855, latency determiner 1210 of FIG. 12 may determine latency 1070 of FIG. 10 for the node. At block 1860, bandwidth determiner 1215 of FIG. 12 may determine bandwidth 1075 of FIG. 10 for the node. And at block 1865, multi-weight edge generator 1130 of FIG. 11 may store distance 1065 of FIG. 10, latency 1070 of FIG. 10, and bandwidth 1085 of FIG. 10 in the multi-weight edge.

Regardless of whether the multi-weight edge connects to a merged virtual storage device or not, at block 1870 (FIG. 18C), identifier determiner 1220 of FIG. 12 may determine device physical identifier 1080 of FIG. 10 for the multi-weight edge. At block 1875, identifier determiner 1220 of FIG. 12 may determine device interface identifier 1085 of FIG. 10 for the multi-weight edge. At block 1880, multi-weight edge generator 1130 of FIG. 11 may store device physical identifier 1080 of FIG. 10 and device interface identifier 1085 of FIG. 10 in the multi-weight edge. At block 1090, multi-weight edge generator 1130 of FIG. 9 may determine if there are additional multi-weight edges to consider. If so, then processing returns to block 1820 of FIG. 18A; otherwise, processing is complete.

Figure 19:
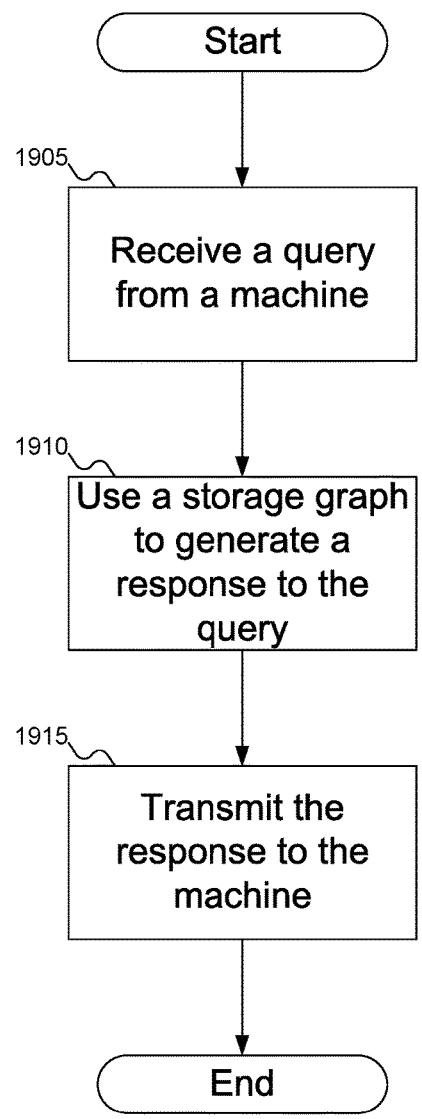
FIG. 19 shows a flowchart of an example procedure for answering a query based on the storage graph of FIGS. 7-9, according to an embodiment of the inventive concept.

FIG. 19 shows a flowchart of an example procedure for answering query 1305 of FIG. 13 based on storage graph 705 of FIGS. 7-9, according to an embodiment of the inventive concept. In FIG. 19, at block 1905, storage distance predictor 245 of FIG. 2 may receive query 1305 from a machine, such as host machine 110 of FIG. 1 or client machine 140 of FIG. 1. At block 1910, storage distance predictor 245 of FIG. 2 may use storage graph 705 of FIGS. 7-9 to generate response 1310 of FIG. 13 to query 1305 of FIG. 13. And at block 1915, storage distance generator 245 of FIG. 2 may send response 1310 of FIG. 13 back to the machine that sent query 1305 of FIG. 13.

Figure 20:
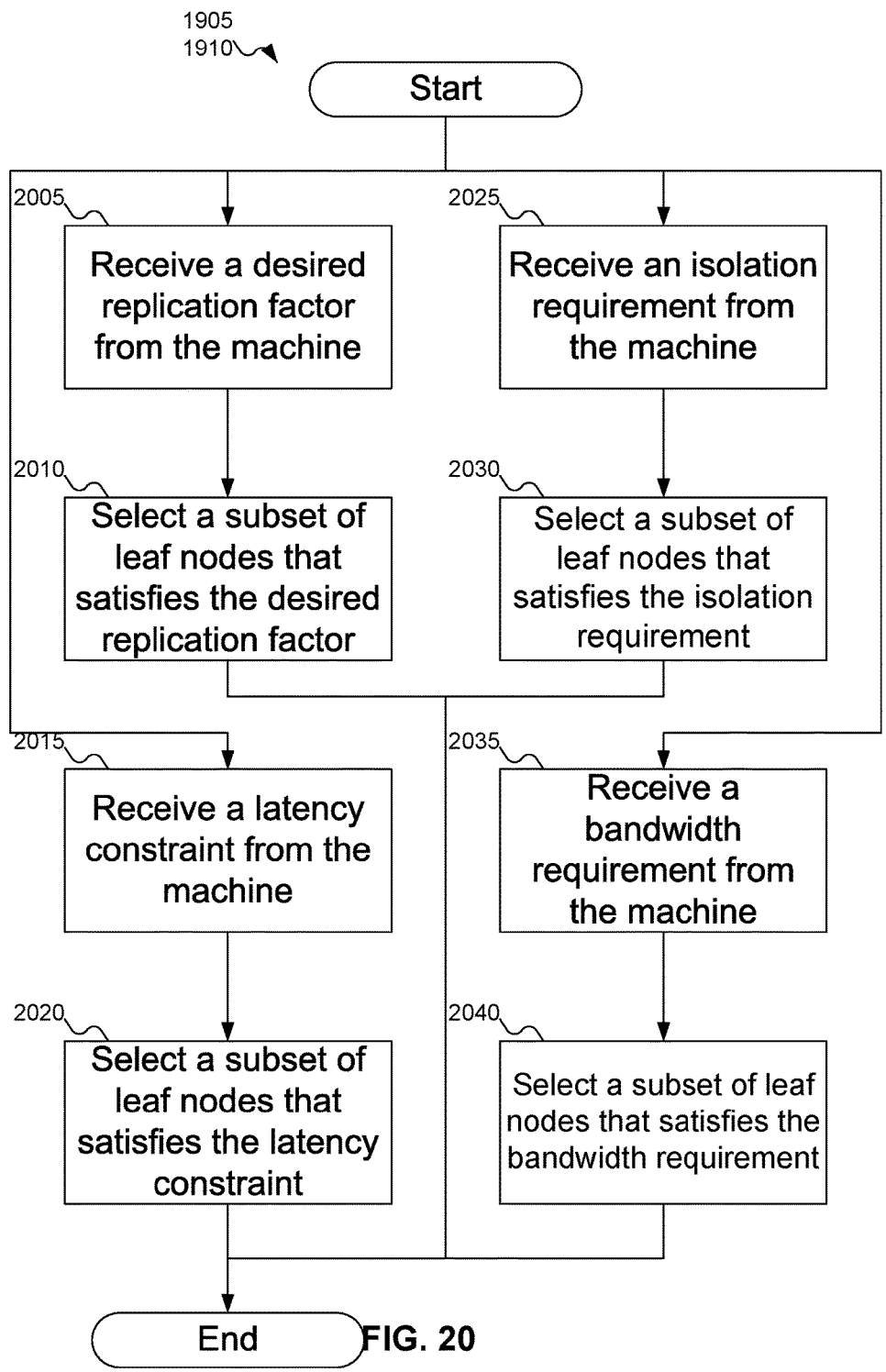
FIG. 20 shows a flowchart of an example procedure for using the storage graph of FIGS. 7-9 to answer a query, according to an embodiment of the inventive concept.

FIG. 20 shows a flowchart of an example procedure for using storage graph 705 of FIGS. 7-9 to answer query 1305 of FIG. 13, according to an embodiment of the inventive concept. In FIG. 20, at block 2005, storage distance generator 245 of FIG. 2 may receive desired replication factor 1405 of FIG. 14 from the machine. At block 2010, subset selector 1315 of FIG. 13 may select a subset of the leaf nodes that satisfies desired replication factor 1405 of FIG. 14.

Alternatively, at block 2015, storage distance generator 245 of FIG. 2 may receive latency constraint 1410 of FIG. 14 from the machine. At block 2020, subset selector 1315 of FIG. 13 may select a subset of the leaf nodes that satisfies latency constraint 1410 of FIG. 14.

Alternatively, at block 2025, storage distance generator 245 of FIG. 2 may receive isolation requirement 1415 of FIG. 14 from the machine. At block 2030, subset selector 1315 of FIG. 13 may select a subset of the leaf nodes that satisfies isolation requirement 1415 of FIG. 14.

Alternatively, at block 2035, storage distance generator 245 of FIG. 2 may receive bandwidth requirement 1420 of FIG. 14 from the machine. At block 2040, subset selector 1315 of FIG. 13 may select a subset of the leaf nodes that satisfies bandwidth requirement 1420 of FIG. 14.

In FIGS. 17-20, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including harddrives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a system, comprising:

reception logic (230) to receive a query (1305) from a machine (110, 140);

transmission logic (235) to transmit a response (1310) to the query (1305) to the machine (110, 140);

storage (225) for a storage graph (705), the storage graph (705) including a plurality of nodes (710, 715, 720, 725, 730, 735, 740, 745, 750, 755, 760, 830, 835, 840, 845, 850, 855, 860, 865, 1020, 1030) and at least one multi-weight edge (805, 810, 815, 820, 825, 910, 915, 1055, 1060), the plurality of nodes (710, 715, 720, 725, 730, 735, 740, 745, 750, 755, 760, 830, 835, 840, 845, 850, 855, 860, 865, 1020, 1030) including a root node (710) and at least one node (735, 740, 745, 750, 755, 760, 830, 835, 840, 845, 850, 855, 860, 865, 1020, 1030) representing one of a physical storage device (220, 505, 615, 620, 625, 630) or a virtual storage device (405, 410, 415), and an edge of the at least one multi-weight edge (805, 810, 815, 820, 825, 910, 915, 1055, 1060) between two nodes in the plurality of nodes (710, 715, 720, 725, 730, 735, 740, 745, 750, 755, 760, 830, 835, 840, 845, 850, 855, 860, 865, 1020, 1030); and a storage distance predictor (245) to use the storage graph (705) to generate the response (1310) to the query (1305) from the machine (110, 140).

Statement 2. An embodiment of the inventive concept includes a system according to statement 1, wherein the reception logic (230) is operative to receive the query (1305) from an application on the machine (110, 140).

Statement 3. An embodiment of the inventive concept includes a system according to statement 1, wherein the edge of the at least one multi-weight edge (805, 810, 815, 820, 825, 910, 915, 1055, 1060) includes a latency (1070) and a bandwidth (1075).

Statement 4. An embodiment of the inventive concept includes a system according to statement 3, wherein the edge of the at least one multi-weight edge (805, 810, 815, 820, 825, 910, 915, 1055, 1060) further includes a distance (1065).

Statement 5. An embodiment of the inventive concept includes a system according to statement 4, wherein the latency (1070) may be derived from the distance (1065).

Statement 6. An embodiment of the inventive concept includes a system according to statement 3, wherein the edge of the at least one multi-weight edge (805, 810, 815, 820, 825, 910, 915, 1055, 1060) further includes at least one ID (1080, 1085) for a node to which the edge connects.

Statement 7. An embodiment of the inventive concept includes a system according to statement 6, wherein the at least one ID (1080, 1085) includes a device physical ID (1080).

Statement 8. An embodiment of the inventive concept includes a system according to statement 6, wherein the at least one ID (1080, 1085) includes a device interface ID (1085).

Statement 9. An embodiment of the inventive concept includes a system according to statement 1, wherein the plurality of nodes (710, 715, 720, 725, 730, 735, 740, 745, 750, 755, 760, 830, 835, 840, 845, 850, 855, 860, 865, 1020, 1030) includes an internal node (715, 720, 725, 730, 735, 740, 745, 750, 755, 760) representing one of a host machine (110, 115, 120, 125, 130) and a Network Attached Storage (NAS).

Statement 10. An embodiment of the inventive concept includes a system according to statement 1, wherein the at least one node (735, 740, 745, 750, 755, 760, 830, 835, 840, 845, 850, 855, 860, 865, 1020, 1030) includes a node (830, 835, 840, 845, 850, 855, 860, 865, 1020, 1030) representing the virtual storage device (405, 410, 415).

Statement 11. An embodiment of the inventive concept includes a system according to statement 1, wherein the at least one node (735, 740, 745, 750, 755, 760, 830, 835, 840, 845, 850, 855, 860, 865, 1020, 1030) includes a merged virtual storage device (510), the merged virtual storage device (510) virtually combining at least two physical storage devices (220, 505, 615, 620, 625, 630).

Statement 12. An embodiment of the inventive concept includes a system according to statement 11, wherein the at least one multi-weight edge (805, 810, 815, 820, 825, 910, 915, 1055, 1060) includes an aggregate multi-weight edge (920) to which the merged virtual storage device (510) connects.

Statement 13. An embodiment of the inventive concept includes a system according to statement 12, wherein the aggregate multi-weight edge (920) includes a merged latency (1070) and a merged bandwidth (1075), the merged latency (1070) representing a mean of a plurality of latencies in edges of the at least one multi-weight edge (805, 810, 815, 820, 825, 910, 915, 1055, 1060) that connect to one of the at least two virtual storage devices (405, 410, 415), the merged bandwidth (1075) representing a sum of a plurality of bandwidths (1075) in edges of the at least one multi-weight edge (805, 810, 815, 820, 825, 910, 915, 1055, 1060) that connect to one of the at least two virtual storage devices (405, 410, 415).

Statement 14. An embodiment of the inventive concept includes a system according to statement 13, wherein:

the merged latency (1070) represents a weighted mean of the plurality of latencies in edges of the at least one multi-weight edge (805, 810, 815, 820, 825, 910, 915, 1055, 1060) that connect to one of the at least two virtual storage devices (405, 410, 415); and the merged bandwidth (1075) represents a weighted sum of the plurality of bandwidths (1075) in edges of the at least one multi-weight edge (805, 810, 815, 820, 825, 910, 915, 1055, 1060) that connect to one of the at least two virtual storage devices (405, 410, 415).

Statement 15. An embodiment of the inventive concept includes a system according to statement 12, wherein the aggregate multi-weight edge (920) further includes a merged distance (1065) representing a mean of a plurality of distances (1065) in edges of the at least one multi-weight edge (805, 810, 815, 820, 825, 910, 915, 1055, 1060) that connect to one of the at least two virtual storage devices (405, 410, 415).

Statement 16. An embodiment of the inventive concept includes a system according to statement 15, wherein the merged distance (1065) represents a weighted mean of the plurality of distances in edges of the at least one multi-weight edge (805, 810, 815, 820, 825, 910, 915, 1055, 1060) that connect to one of the at least two virtual storage devices (405, 410, 415).

Statement 17. An embodiment of the inventive concept includes a system according to statement 1, wherein the virtual storage device (405, 410, 415) and a second virtual storage device (405, 410, 415) are both stored within a single physical storage device (220, 505, 615, 620, 625, 630).

Statement 18. An embodiment of the inventive concept includes a system according to statement 1, wherein:

the query (1305) includes a desired replication factor (1405); and the storage distance predictor (245) includes a subset selector (1315) to select a subset of the nodes (735, 740, 745, 750, 755, 760, 830, 835, 840, 845, 850, 855, 860, 865, 1020, 1030) that satisfies the desired replication factor (1405).

Statement 19. An embodiment of the inventive concept includes a system according to statement 18, wherein the subset selector (1315) is operative to select the subset of the nodes (735, 740, 745, 750, 755, 760, 830, 835, 840, 845, 850, 855, 860, 865, 1020, 1030) that satisfies the desired replication factor (1405) while maximizing bandwidth (1075).

Statement 20. An embodiment of the inventive concept includes a system according to statement 18, wherein:

the query (1305) further includes a latency constraint (1410); and the subset selector (1315) is operative to select the subset of the nodes (735, 740, 745, 750, 755, 760, 830, 835, 840, 845, 850, 855, 860, 865, 1020, 1030) that satisfies the desired replication factor (1405) and the latency constraint (1410).

Statement 21. An embodiment of the inventive concept includes a system according to statement 20, wherein the subset selector (1315) is operative to select the subset of the nodes (735, 740, 745, 750, 755, 760, 830, 835, 840, 845, 850, 855, 860, 865, 1020, 1030) that satisfies the desired replication factor (1405), wherein the latency (1070) between any two nodes (735, 740, 745, 750, 755, 760, 830, 835, 840, 845, 850, 855, 860, 865, 1020, 1030) in the subset of the nodes (735, 740, 745, 750, 755, 760, 830, 835, 840, 845, 850, 855, 860, 865, 1020, 1030) that satisfies the desired replication factor (1405) is no greater than the latency constraint (1410).

Statement 22. An embodiment of the inventive concept includes a system according to statement 20, wherein the subset selector (1315) is operative to select the subset of the nodes (735, 740, 745, 750, 755, 760, 830, 835, 840, 845, 850, 855, 860, 865, 1020, 1030) that satisfies the desired replication factor (1405) and the latency constraint (1410) while maximizing bandwidth (1075).

Statement 23. An embodiment of the inventive concept includes a system according to statement 1, wherein:
the query (1305) includes a latency constraint (1410); and
the subset selector (1315) is operative to select the subset of the nodes (735, 740, 745, 750, 755, 760, 830, 835, 840, 845, 850, 855, 860, 865, 1020, 1030) that satisfies the latency constraint (1410).

Statement 24. An embodiment of the inventive concept includes a system according to statement 23, wherein the subset selector (1315) is operative to select the subset of the nodes (735, 740, 745, 750, 755, 760, 830, 835, 840, 845, 850, 855, 860, 865, 1020, 1030) wherein the latency (1070) between any two nodes (735, 740, 745, 750, 755, 760, 830, 835, 840, 845, 850, 855, 860, 865, 1020, 1030) in the subset of the nodes (735, 740, 745, 750, 755, 760, 830, 835, 840, 845, 850, 855, 860, 865, 1020, 1030) is no greater than the latency constraint (1410).

Statement 25. An embodiment of the inventive concept includes a system according to statement 1, wherein:
the query (1305) includes a bandwidth requirement (1420); and
the storage distance predictor (245) includes a subset selector (1315) to select a subset of the nodes (735, 740, 745, 750, 755, 760, 830, 835, 840, 845, 850, 855, 860, 865, 1020, 1030) that satisfies the bandwidth requirement (1420).

Statement 26. An embodiment of the inventive concept includes a system according to statement 1, wherein:
the query (1305) includes an isolation requirement (1415) specifying isolation from a target application; and
the storage distance predictor (245) includes a subset selector (1315) to select a subset of the nodes (735, 740, 745, 750, 755, 760, 830, 835, 840, 845, 850, 855, 860, 865, 1020, 1030) that satisfies the isolation requirement (1415).

Statement 27. An embodiment of the inventive concept includes a system according to statement 26, wherein the subset selector (1315) is operative to select a subset of the nodes (735, 740, 745, 750, 755, 760, 830, 835, 840, 845, 850, 855, 860, 865, 1020, 1030) such that no node (735, 740, 745, 750, 755, 760, 830, 835, 840, 845, 850, 855, 860, 865, 1020, 1030) in the subset of nodes (735, 740, 745, 750, 755, 760, 830, 835, 840, 845, 850, 855, 860, 865, 1020, 1030) is being used by the target application.

Statement 28. An embodiment of the inventive concept includes a system according to statement 1, wherein the reception logic (230) is operative to receive the query (1305) via one of a Secure Shell (SSH), a web interface, and an Application Program Interface (API).

Statement 29. An embodiment of the inventive concept includes a system according to statement 1, wherein:
the reception logic (230) is operative to receive at least a partial system topology (1105) for a data center (105) and local storage information (1110) for a host machine (110, 115, 120, 125, 130); and
the system further comprises a storage graph generator (240) to generate the storage graph (705) using the at least a partial system topology (1105) and the local storage information (1110).

Statement 30. An embodiment of the inventive concept includes a system according to statement 29, wherein the storage graph generator (240) includes:

a root node identifier (1115) to identify a node in the at least a partial system topology (1105) as the root node (710);
an internal node identifier (1120) to identify at least one internal node (715, 720, 725, 730, 735, 740, 745, 750, 755, 760) in the at least a partial system topology (1105) and the local storage information (1110), the at least one internal node (715, 720, 725, 730, 735, 740, 745, 750, 755, 760) representing at least one of a switch (505, 510), a router, a gateway, the host machine (110, 115, 120, 125, 130), and a physical storage device (220, 505, 615, 620, 625, 630); and
a storage node identifier (1125) to identify the at least one node (735, 740, 745, 750, 755, 760, 830, 835, 840, 845, 850, 855, 860, 865, 1020, 1030), the node (735, 740, 745, 750, 755, 760, 830, 835, 840, 845, 850, 855, 860, 865, 1020, 1030) representing the one of the physical storage device (220, 505, 615, 620, 625, 630) and the virtual storage device (405, 410, 415) within the at least a partial system topology (1105) and the local storage information (1110).

Statement 31. An embodiment of the inventive concept includes a system according to statement 30, wherein the storage graph generator (240) further includes a multi-weight edge generator (1130) to generate the at least one multi-weight edge (805, 810, 815, 820, 825, 910, 915, 1055, 1060).

Statement 32. An embodiment of the inventive concept includes a system according to statement 31, wherein:
the multi-weight edge generator (1130) includes:
a latency determiner (1210) to determine a latency (1070) between two nodes in the plurality of nodes (710, 715, 720, 725, 730, 735, 740, 745, 750, 755, 760, 830, 835, 840, 845, 850, 855, 860, 865, 1020, 1030); and
a bandwidth determiner (1215) to determine a bandwidth (1075) between the two nodes in the plurality of nodes (710, 715, 720, 725, 730, 735, 740, 745, 750, 755, 760, 830, 835, 840, 845, 850, 855, 860, 865, 1020, 1030); and
the multi-weight edge generator (1130) is operative to include the latency (1070) and the distance (1065) in the at least one multi-weight edge (805, 810, 815, 820, 825, 910, 915, 1055, 1060).

Statement 33. An embodiment of the inventive concept includes a system according to statement 32, wherein:
the multi-weight edge generator (1130) includes a distance determiner (1205) to determine a distance (1065) between the two nodes in the plurality of nodes (710, 715, 720, 725, 730, 735, 740, 745, 750, 755, 760, 830, 835, 840, 845, 850, 855, 860, 865, 1020, 1030); and
the multi-weight edge generator (1130) is operative to include the distance (1065) in the at least one multi-weight edge (805, 810, 815, 820, 825, 910, 915, 1055, 1060).

Statement 34. An embodiment of the inventive concept includes a system according to statement 33, wherein the latency (1070) may be derived from the distance (1065).

Statement 35. An embodiment of the inventive concept includes a system according to statement 31, wherein:
the multi-weight edge generator (1130) includes an ID determiner (1220) to identify an ID of one of the two nodes in the plurality of nodes (710, 715, 720, 725, 730, 735, 740, 745, 750, 755, 760, 830, 835, 840, 845, 850, 855, 860, 865, 1020, 1030); and
the multi-weight edge generator (1130) is operative to include the ID of the one of the two nodes in the at least one multi-weight edge (805, 810, 815, 820, 825, 910, 915, 1055, 1060).

Statement 36. An embodiment of the inventive concept includes a system according to statement 35, wherein the ID includes a device physical ID (1080) of the host machine (110, 115, 120, 125, 130).

Statement 37. An embodiment of the inventive concept includes a system according to statement 35, wherein the ID includes a device interface ID (1085) of a physical storage device (220, 505, 615, 620, 625, 630) in the host machine (110, 115, 120, 125, 130).

Statement 38. An embodiment of the inventive concept includes a system according to statement 31, wherein the virtual storage device (405, 410, 415) includes a merged virtual storage device (510), the merged virtual storage device (510) virtually combining at least two physical storage devices (220, 505, 615, 620, 625, 630).

Statement 39. An embodiment of the inventive concept includes a system according to statement 38, wherein the multi-weight edge generator (1130) is operative to generate an aggregate multi-weight edge (920) to which the merged virtual storage device (510) connects.

Statement 40. An embodiment of the inventive concept includes a system according to statement 39, wherein the aggregate multi-weight edge (920) includes a merged latency (1070) and a merged bandwidth (1075), the merged latency (1070) representing a mean of a plurality of latencies in edges of the at least one multi-weight edge (805, 810, 815, 820, 825, 910, 915, 1055, 1060) that connect to one of the at least two virtual storage devices (405, 410, 415), the merged bandwidth (1075) representing a sum of a plurality of bandwidths (1075) in edges of the at least one multi-weight edge (805, 810, 815, 820, 825, 910, 915, 1055, 1060) that connect to one of the at least two virtual storage devices (405, 410, 415).

Statement 41. An embodiment of the inventive concept includes a system according to statement 40, wherein:

the merged latency (1070) represents a weighted mean of the plurality of latencies in edges of the at least one multi-weight edge (805, 810, 815, 820, 825, 910, 915, 1055, 1060) that connect to one of the at least two virtual storage devices (405, 410, 415); and the merged bandwidth (1075) represents a weighted sum of the plurality of bandwidths (1075) in edges of the at least one multi-weight edge (805, 810, 815, 820, 825, 910, 915, 1055, 1060) that connect to one of the at least two virtual storage devices (405, 410, 415).

Statement 42. An embodiment of the inventive concept includes a system according to statement 40, wherein the aggregate multi-weight edge (920) further includes a merged distance (1065) representing a mean of a plurality of distances (1065) in edges of the at least one multi-weight edge (805, 810, 815, 820, 825, 910, 915, 1055, 1060) that connect to one of the at least two virtual storage devices (405, 410, 415).

Statement 43. An embodiment of the inventive concept includes a system according to statement 42, wherein the merged distance (1065) represents a weighted mean of the plurality of distances in edges of the at least one multi-weight edge (805, 810, 815, 820, 825, 910, 915, 1055, 1060) that connect to one of the at least two virtual storage devices (405, 410, 415).

Statement 44. An embodiment of the inventive concept includes a memory (210) for storing a storage graph (705) for use by a storage distance predictor (245), comprising:

a data structure (1005) stored in the memory (210), the data structure (1005) including:

a plurality of nodes (710, 715, 720, 725, 730, 735, 740, 745, 750, 755, 760, 830, 835, 840, 845, 850, 855, 860, 865, 1020, 1030) including a root node (710) and at least one node (735, 740, 745, 750, 755, 760, 830, 835, 840, 845, 850, 855, 860, 865, 1020, 1030) representing one of a physical storage device (220, 505, 615, 620, 625, 630) or a virtual storage device (405, 410, 415); and and at least one multi-weight edge (805, 810, 815, 820, 825, 910, 915, 1055, 1060), an edge of the at least one multi-weight edge (805, 810, 815, 820, 825, 910, 915, 1055, 1060) between two nodes in the plurality of nodes (710, 715, 720, 725, 730, 735, 740, 745, 750, 755, 760, 830, 835, 840, 845, 850, 855, 860, 865, 1020, 1030).

Statement 45. An embodiment of the inventive concept includes a memory (210) according to statement 44, wherein the edge of the at least one multi-weight edge (805, 810, 815, 820, 825, 910, 915, 1055, 1060) includes a latency (1070) and a bandwidth (1075).

Statement 46. An embodiment of the inventive concept includes a memory (210) according to statement 45, wherein the edge of the at least one multi-weight edge (805, 810, 815, 820, 825, 910, 915, 1055, 1060) further includes a distance (1065).

Statement 47. An embodiment of the inventive concept includes a memory (210) according to statement 46, wherein the latency (1070) may be derived from the distance (1065).

Statement 48. An embodiment of the inventive concept includes a memory (210) according to statement 45, wherein the edge of the at least one multi-weight edge (805, 810, 815, 820, 825, 910, 915, 1055, 1060) further includes at least one ID (1080, 1085) for a node to which the edge connects.

Statement 49. An embodiment of the inventive concept includes a memory (210) according to statement 48, wherein the at least one ID (1080, 1085) includes a device physical ID (1080).

Statement 50. An embodiment of the inventive concept includes a memory (210) according to statement 48, wherein the at least one ID (1080, 1085) includes a device interface ID (1085).

Statement 51. An embodiment of the inventive concept includes a memory (210) according to statement 44, wherein the plurality of nodes (710, 715, 720, 725, 730, 735, 740, 745, 750, 755, 760, 830, 835, 840, 845, 850, 855, 860, 865, 1020, 1030) includes an internal node (715, 720, 725, 730, 735, 740, 745, 750, 755, 760) representing one of a host machine (110, 115, 120, 125, 130 and a Network Attached Storage (NAS).

Statement 52. An embodiment of the inventive concept includes a memory (210) according to statement 44, wherein the at least one node (735, 740, 745, 750, 755, 760, 830, 835, 840, 845, 850, 855, 860, 865, 1020, 1030) includes a leaf node (830, 835, 840, 845, 850, 855, 860, 865, 1020, 1030) representing the virtual storage device (405, 410, 415).

Statement 53. An embodiment of the inventive concept includes a memory (210) according to statement 52, wherein the virtual storage device (405, 410, 415) and a second virtual storage device (405, 410, 415) are both stored within a single physical storage device (220, 505, 615, 620, 625, 630).

Statement 54. An embodiment of the inventive concept includes a memory (210) according to statement 52, wherein the virtual storage device (405, 410, 415) includes a merged virtual storage device (510), the merged virtual storage device (510) virtually combining at least two physical storage devices (220, 505, 615, 620, 625, 630).

Statement 55. An embodiment of the inventive concept includes a memory (210) according to statement 54, wherein the at least one multi-weight edge (805, 810, 815, 820, 825,

910, 915, 1055, 1060) includes an aggregate multi-weight edge (920) to which the merged virtual storage device (510) connects.

Statement 56. An embodiment of the inventive concept includes a memory (210) according to statement 55, wherein the aggregate multi-weight edge (920) includes a merged latency (1070) and a merged bandwidth (1075), the merged latency (1070) representing a mean of a plurality of latencies in edges of the at least one multi-weight edge (805, 810, 815, 820, 825, 910, 915, 1055, 1060) that connect to one of the at least two virtual storage devices (405, 410, 415), the merged bandwidth (1075) representing a sum of a plurality of bandwidths (1075) in edges of the at least one multi-weight edge (805, 810, 815, 820, 825, 910, 915, 1055, 1060) that connect to one of the at least two virtual storage devices (405, 410, 415).

Statement 57. An embodiment of the inventive concept includes a memory (210) according to statement 56, wherein:

the merged latency (1070) represents a weighted mean of the plurality of latencies in edges of the at least one multi-weight edge (805, 810, 815, 820, 825, 910, 915, 1055, 1060) that connect to one of the at least two virtual storage devices (405, 410, 415); and the merged bandwidth (1075) represents a weighted sum of the plurality of bandwidths (1075) in edges of the at least one multi-weight edge (805, 810, 815, 820, 825, 910, 915, 1055, 1060) that connect to one of the at least two virtual storage devices (405, 410, 415).

Statement 58. An embodiment of the inventive concept includes a memory (210) according to statement 55, wherein the aggregate multi-weight edge (920) further includes a merged distance (1065) representing a mean of a plurality of distances (1065) in edges of the at least one multi-weight edge (805, 810, 815, 820, 825, 910, 915, 1055, 1060) that connect to one of the at least two virtual storage devices (405, 410, 415).

Statement 59. An embodiment of the inventive concept includes a memory (210) according to statement 58, wherein the merged distance (1065) represents a weighted mean of the plurality of distances in edges of the at least one multi-weight edge (805, 810, 815, 820, 825, 910, 915, 1055, 1060) that connect to one of the at least two virtual storage devices (405, 410, 415).

Statement 60. An embodiment of the inventive concept includes a memory (210) for storing a storage graph (705) for use by a storage distance predictor (245), comprising:

a data structure (1005) stored in the memory (210), the data structure (1005) including:

a plurality of nodes (710, 715, 720, 725, 730, 735, 740, 745, 750, 755, 760, 830, 835, 840, 845, 850, 855, 860, 865, 1020, 1030) including a root node (710) and at least two nodes (735, 740, 745, 750, 755, 760, 830, 835, 840, 845, 850, 855, 860, 865, 1020, 1030), a first node of the at least two nodes representing a physical storage device (220, 505, 615, 620, 625, 630) and a second node of the at least two nodes representing a virtual storage device (405, 410, 415); and and at least one edge (805, 810, 815, 820, 825, 910, 915, 1055, 1060), an edge of the at least one edge (805, 810, 815, 820, 825, 910, 915, 1055, 1060) between two nodes in the plurality of nodes (710, 715, 720, 725, 730, 735, 740, 745, 750, 755, 760, 830, 835, 840, 845, 850, 855, 860, 865, 1020, 1030).

Statement 61. An embodiment of the inventive concept includes a memory (210) according to statement 60, wherein the plurality of nodes (710, 715, 720, 725, 730, 735, 740, 745, 750, 755, 760, 830, 835, 840, 845, 850, 855, 860, 865, 1020, 1030) includes an internal node (715, 720, 725, 730, 735, 740, 745, 750, 755, 760) representing one of a host machine (110, 115, 120, 125, 130) and a Network Attached Storage (NAS).

Statement 62. An embodiment of the inventive concept includes a memory (210) according to statement 60, wherein the at least one node (735, 740, 745, 750, 755, 760, 830, 835, 840, 845, 850, 855, 860, 865, 1020, 1030) includes a leaf node (830, 835, 840, 845, 850, 855, 860, 865, 1020, 1030) representing the virtual storage device (405, 410, 415).

Statement 63. An embodiment of the inventive concept includes a memory (210) according to statement 62, wherein the virtual storage device (405, 410, 415) and a second virtual storage device (405, 410, 415) are both stored within a single physical storage device (220, 505, 615, 620, 625, 630).

Statement 64. An embodiment of the inventive concept includes a memory (210) according to statement 62, wherein the virtual storage device (405, 410, 415) includes a merged virtual storage device (510), the merged virtual storage device (510) virtually combining at least two physical storage devices (220, 505, 615, 620, 625, 630).

Statement 65. An embodiment of the inventive concept includes a system comprising:

a reception logic (230) to receive at least a partial system topology (1105) for a data center (105) and local storage information (1110) for a host machine (110, 115, 120, 125, 130); and a storage graph generator (240) to generate a storage graph (705) using the at least a partial system topology (1105) and the local storage information (1110), the storage graph (705) including a plurality of nodes (710, 715, 720, 725, 730, 735, 740, 745, 750, 755, 760, 830, 835, 840, 845, 850, 855, 860, 865, 1020, 1030) and at least one multi-weight edge (805, 810, 815, 820, 825, 910, 915, 1055, 1060), the plurality of nodes (710, 715, 720, 725, 730, 735, 740, 745, 750, 755, 760, 830, 835, 840, 845, 850, 855, 860, 865, 1020, 1030) including a root node (710) and at least one node (735, 740, 745, 750, 755, 760, 830, 835, 840, 845, 850, 855, 860, 865, 1020, 1030) representing one of a physical storage device (220, 505, 615, 620, 625, 630) or a virtual storage device (405, 410, 415), and an edge of the at least one multi-weight edge (805, 810, 815, 820, 825, 910, 915, 1055, 1060) between two nodes in the plurality of nodes (710, 715, 720, 725, 730, 735, 740, 745, 750, 755, 760, 830, 835, 840, 845, 850, 855, 860, 865, 1020, 1030).

Statement 66. An embodiment of the inventive concept includes a system according to statement 65, wherein the storage graph generator (240) includes:

a root node identifier (1115) to identify a node in the at least a partial system topology (1105) as the root node (710);

an internal node identifier (1120) to identify at least one internal node (715, 720, 725, 730, 735, 740, 745, 750, 755, 760) in the at least a partial system topology (1105) and the local storage information (1110), the at least one internal node (715, 720, 725, 730, 735, 740, 745, 750, 755, 760) representing at least one of a switch (505, 510), a router, a gateway, the host machine (110, 115, 120, 125, 130), and a physical storage device (220, 505, 615, 620, 625, 630); and a storage node identifier (1125) to identify the at least one node (735, 740, 745, 750, 755, 760, 830, 835, 840, 845, 850, 855, 860, 865, 1020, 1030), the node (830, 835, 840, 845, 850, 855, 860, 865, 1020, 1030) representing the one of the physical storage device (220, 505, 615, 620, 625, 630) and the virtual storage device (405, 410, 415) within at least one physical storage device (220, 505, 615, 620, 625, 630)

within the at least a partial system topology (1105) and the local storage information (1110).

Statement 67. An embodiment of the inventive concept includes a system according to statement 66, wherein the storage graph generator (240) further includes a multi-weight edge generator (1130) to generate the at least one multi-weight edge (805, 810, 815, 820, 825, 910, 915, 1055, 1060).

Statement 68. An embodiment of the inventive concept includes a system according to statement 67, wherein:

the multi-weight edge generator (1130) includes:

a latency determiner (1210) to determine a latency (1070) between two nodes in the plurality of nodes (710, 715, 720, 725, 730, 735, 740, 745, 750, 755, 760, 830, 835, 840, 845, 850, 855, 860, 865, 1020, 1030); and a bandwidth determiner (1215) to determine a bandwidth (1075) between the two nodes in the plurality of nodes (710, 715, 720, 725, 730, 735, 740, 745, 750, 755, 760, 830, 835, 840, 845, 850, 855, 860, 865, 1020, 1030); and the multi-weight edge generator (1130) is operative to include the latency (1070) and the distance (1065) in the at least one multi-weight edge (805, 810, 815, 820, 825, 910, 915, 1055, 1060).

Statement 69. An embodiment of the inventive concept includes a system according to statement 68, wherein:

the multi-weight edge generator (1130) includes a distance determiner (1205) to determine a distance (1065) between the two nodes in the plurality of nodes (710, 715, 720, 725, 730, 735, 740, 745, 750, 755, 760, 830, 835, 840, 845, 850, 855, 860, 865, 1020, 1030); and the multi-weight edge generator (1130) is operative to include the distance (1065) in the at least one multi-weight edge (805, 810, 815, 820, 825, 910, 915, 1055, 1060).

Statement 70. An embodiment of the inventive concept includes a system according to statement 69, wherein the latency (1070) may be derived from the distance (1065).

Statement 71. An embodiment of the inventive concept includes a system according to statement 67, wherein:

the multi-weight edge generator (1130) includes an ID determiner (1220) to identify an ID (1080, 1085) of one of the two nodes in the plurality of nodes (710, 715, 720, 725, 730, 735, 740, 745, 750, 755, 760, 830, 835, 840, 845, 850, 855, 860, 865, 1020, 1030); and the multi-weight edge generator (1130) is operative to include the ID (1080, 1085) of the one of the two nodes in the at least one multi-weight edge (805, 810, 815, 820, 825, 910, 915, 1055, 1060).

Statement 72. An embodiment of the inventive concept includes a system according to statement 71, wherein the ID (1080, 1085) includes a device physical ID (1080) of the host machine (110, 115, 120, 125, 130).

Statement 73. An embodiment of the inventive concept includes a system according to statement 71, wherein the ID (1080, 1085) includes a device interface ID (1085) of a physical storage device (220, 505, 615, 620, 625, 630) in the host machine (110, 115, 120, 125, 130).

Statement 74. An embodiment of the inventive concept includes a system according to statement 67, wherein the virtual storage device (405, 410, 415) includes a merged virtual storage device (510), the merged virtual storage device (510) virtually combining at least two physical storage devices (220, 505, 615, 620, 625, 630).

Statement 75. An embodiment of the inventive concept includes a system according to statement 74, wherein the multi-weight edge generator (1130) is operative to generate an aggregate multi-weight edge (920) to which the merged virtual storage device (510) connects.

Statement 76. An embodiment of the inventive concept includes a system according to statement 75, wherein the aggregate multi-weight edge (920) includes a merged latency (1070) and a merged bandwidth (1075), the merged latency (1070) representing a mean of a plurality of latencies in edges of the at least one multi-weight edge (805, 810, 815, 820, 825, 910, 915, 1055, 1060) that connect to one of the at least two virtual storage devices (405, 410, 415), the merged bandwidth (1075) representing a sum of a plurality of bandwidths (1075) in edges of the at least one multi-weight edge (805, 810, 815, 820, 825, 910, 915, 1055, 1060) that connect to one of the at least two virtual storage devices (405, 410, 415).

Statement 77. An embodiment of the inventive concept includes a system according to statement 76, wherein:

the merged latency (1070) represents a weighted mean of the plurality of latencies in edges of the at least one multi-weight edge (805, 810, 815, 820, 825, 910, 915, 1055, 1060) that connect to one of the at least two virtual storage devices (405, 410, 415); and the merged bandwidth (1075) represents a weighted sum of the plurality of bandwidths (1075) in edges of the at least one multi-weight edge (805, 810, 815, 820, 825, 910, 915, 1055, 1060) that connect to one of the at least two virtual storage devices (405, 410, 415).

Statement 78. An embodiment of the inventive concept includes a system according to statement 76, wherein the aggregate multi-weight edge (920) further includes a merged distance (1065) representing a mean of a plurality of distances (1065) in edges of the at least one multi-weight edge (805, 810, 815, 820, 825, 910, 915, 1055, 1060) that connect to one of the at least two virtual storage devices (405, 410, 415).

Statement 79. An embodiment of the inventive concept includes a system (210) according to statement 78, wherein the merged distance (1065) represents a weighted mean of the plurality of distances in edges of the at least one multi-weight edge (805, 810, 815, 820, 825, 910, 915, 1055, 1060) that connect to one of the at least two virtual storage devices (405, 410, 415).

Statement 80. An embodiment of the inventive concept includes a system comprising:

a reception logic (230) to receive at least a partial system topology (1105) for a data center (105) and local storage information (1110) for a host machine (110, 115, 120, 125, 130); and a storage graph generator (240) to generate a storage graph (705) using the at least a partial system topology (1105) and the local storage information (1110), the storage graph (705) including a plurality of nodes (710, 715, 720, 725, 730, 735, 740, 745, 750, 755, 760, 830, 835, 840, 845, 850, 855, 860, 865, 1020, 1030) and at least one edge (805, 810, 815, 820, 825, 910, 915, 1055, 1060), the plurality of nodes (710, 715, 720, 725, 730, 735, 740, 745, 750, 755, 760, 830, 835, 840, 845, 850, 855, 860, 865, 1020, 1030) including a root node (710), a first node (735, 740, 745, 750, 755, 760, 830, 835, 840, 845, 850, 855, 860, 865, 1020, 1030) representing a physical storage device (220, 505, 615, 620, 625, 630), and a second node representing a virtual storage device (405, 410, 415), and an edge of the at least one edge (805, 810, 815, 820, 825, 910, 915, 1055, 1060) between two nodes in the plurality of nodes (710, 715, 720, 725, 730, 735, 740, 745, 750, 755, 760, 830, 835, 840, 845, 850, 855, 860, 865, 1020, 1030).

Statement 81. An embodiment of the inventive concept includes a system according to statement 80, wherein the storage graph generator (240) includes:

a root node identifier (1115) to identify a node in the at least a partial system topology (1105) as the root node (710);

an internal node identifier (1120) to identify at least one internal node (715, 720, 725, 730, 735, 740, 745, 750, 755, 760) in the at least a partial system topology (1105) and the local storage information (1110), the at least one internal node (715, 720, 725, 730, 735, 740, 745, 750, 755, 760) representing at least one of a switch (505, 510), a router, a gateway, the host machine (110, 115, 120, 125, 130), and a physical storage device (220, 505, 615, 620, 625, 630); and a storage node identifier (1125) to identify the first node (735, 740, 745, 750, 755, 760, 830, 835, 840, 845, 850, 855, 860, 865, 1020, 1030) representing the physical storage device (220, 505, 615, 620, 625, 630) and the second node (735, 740, 745, 750, 755, 760, 830, 835, 840, 845, 850, 855, 860, 865, 1020, 1030) representing the virtual storage device (405, 410, 415) within at least one physical storage device (220, 505, 615, 620, 625, 630) within the at least a partial system topology (1105) and the local storage information (1110).

Statement 82. An embodiment of the inventive concept includes a method, comprising:

receiving (1905) a query (1305) from a machine (110, 140);

using (1910) a storage graph (705) to determine an response (1310) to the query (1305), the storage graph (705) including a plurality of nodes (710, 715, 720, 725, 730, 735, 740, 745, 750, 755, 760, 830, 835, 840, 845, 850, 855, 860, 865, 1020, 1030) and at least one multi-weight edge (805, 810, 815, 820, 825, 910, 915, 1055, 1060), the plurality of nodes (710, 715, 720, 725, 730, 735, 740, 745, 750, 755, 760, 830, 835, 840, 845, 850, 855, 860, 865, 1020, 1030) including a root node (710) and at least one node (735, 740, 745, 750, 755, 760, 830, 835, 840, 845, 850, 855, 860, 865, 1020, 1030) representing one of a physical storage device (220, 505, 615, 620, 625, 630) or a virtual storage device (405, 410, 415), and an edge of the at least one multi-weight edge (805, 810, 815, 820, 825, 910, 915, 1055, 1060) between two nodes in the plurality of nodes (710, 715, 720, 725, 730, 735, 740, 745, 750, 755, 760, 830, 835, 840, 845, 850, 855, 860, 865, 1020, 1030); and transmitting (1915) the response (1310) to the query (1305) to the machine (110, 140).

Statement 83. An embodiment of the inventive concept includes a method according to statement 82, wherein:

receiving (1905) a query (1305) from a machine (110, 140) includes receiving (1905) the query (1305) from an application on the machine (110, 140); and transmitting (1915) the response (1310) to the query (1305) to the machine (110, 140) includes transmitting (1915) the response (1310) to the query (1305) to the application on the machine (110, 140).

Statement 84. An embodiment of the inventive concept includes a method according to statement 82, wherein:

receiving (1905) a query (1305) from a machine (110, 140) includes receiving (2005) a desired replication factor (1405) from the machine (110, 140); and using (1910) a storage graph (705) to determine an response (1310) to the query (1305) includes selecting (2010) a subset of the nodes (735, 740, 745, 750, 755, 760, 830, 835, 840, 845, 850, 855, 860, 865, 1020, 1030) that satisfies the desired replication factor (1405).

Statement 85. An embodiment of the inventive concept includes a method according to statement 84, wherein selecting (2010) a subset of the nodes (735, 740, 745, 750, 755, 760, 830, 835, 840, 845, 850, 855, 860, 865, 1020, 1030) that satisfies the desired replication factor (1405) includes selecting (2010) the subset of the nodes (735, 740, 745, 750, 755, 760, 830, 835, 840, 845, 850, 855, 860, 865, 1020, 1030) that satisfies the desired replication factor (1405) while maximizing bandwidth (1075).

Statement 86. An embodiment of the inventive concept includes a method according to statement 84, wherein:

receiving (1905) a query (1305) from a machine (110, 140) further includes receiving (2015) a latency constraint (1410) from the machine (110, 140); and selecting (2010) the subset of the nodes (735, 740, 745, 750, 755, 760, 830, 835, 840, 845, 850, 855, 860, 865, 1020, 1030) that satisfies the desired replication factor (1405) includes selecting (2010, 2020) the subset of the nodes (735, 740, 745, 750, 755, 760, 830, 835, 840, 845, 850, 855, 860, 865, 1020, 1030) that satisfies the desired replication factor (1405) and the latency constraint (1410).

Statement 87. An embodiment of the inventive concept includes a method according to statement 86, wherein selecting (2010, 2020) the subset of the nodes (735, 740, 745, 750, 755, 760, 830, 835, 840, 845, 850, 855, 860, 865, 1020, 1030) that satisfies the desired replication factor (1405) and the latency constraint (1410) includes selecting (2010, 2020) the subset of the nodes (735, 740, 745, 750, 755, 760, 830, 835, 840, 845, 850, 855, 860, 865, 1020, 1030) that satisfies the desired replication factor (1405), wherein the latency (1070) between any two nodes (735, 740, 745, 750, 755, 760, 830, 835, 840, 845, 850, 855, 860, 865, 1020, 1030) in the subset of the nodes (735, 740, 745, 750, 755, 760, 830, 835, 840, 845, 850, 855, 860, 865, 1020, 1030) that satisfies the desired replication factor (1405) is no greater than the latency constraint (1410).

Statement 88. An embodiment of the inventive concept includes a method according to statement 86, wherein selecting (2010, 2020) the subset of the nodes (735, 740, 745, 750, 755, 760, 830, 835, 840, 845, 850, 855, 860, 865, 1020, 1030) that satisfies the desired replication factor (1405) and the latency constraint (1410) includes selecting (2010, 2020) the subset of the nodes (735, 740, 745, 750, 755, 760, 830, 835, 840, 845, 850, 855, 860, 865, 1020, 1030) that satisfies the desired replication factor (1405) and the latency constraint (1410) while maximizing bandwidth (1075).

Statement 89. An embodiment of the inventive concept includes a method according to statement 82, wherein:

receiving (1905) a query (1305) from a machine (110, 140) includes receiving (2015) a latency constraint (1410) from the machine (110, 140); and using (1910) a storage graph (705) to determine an response (1310) to the query (1305) includes selecting (2010) a subset of the nodes (735, 740, 745, 750, 755, 760, 830, 835, 840, 845, 850, 855, 860, 865, 1020, 1030) that satisfies the latency constraint (1410).

Statement 90. An embodiment of the inventive concept includes a method according to statement 89, wherein selecting (2010, 2020) the subset of the nodes (735, 740, 745, 750, 755, 760, 830, 835, 840, 845, 850, 855, 860, 865, 1020, 1030) that satisfies the latency constraint (1410) includes selecting (2010, 2020) the subset of the nodes (735, 740, 745, 750, 755, 760, 830, 835, 840, 845, 850, 855, 860, 865, 1020, 1030) wherein the latency (1070) between any two nodes (735, 740, 745, 750, 755, 760, 830, 835, 840, 845, 850, 855, 860, 865, 1020, 1030) in the subset of the nodes (735, 740, 745, 750, 755, 760, 830, 835, 840, 845, 850, 855, 860, 865, 1020, 1030) is no greater than the latency constraint (1410).

Statement 91. An embodiment of the inventive concept includes a method according to statement 82, wherein:

receiving (1905) a query (1305) from a machine (110, 140) includes receiving (2035) a bandwidth requirement (1420) from the machine (110, 140); and using (1910) a storage graph (705) to determine an response (1310) to the query (1305) includes selecting (2030) a subset of the nodes (735, 740, 745, 750, 755, 760, 830, 835, 840, 845, 850, 855, 860, 865, 1020, 1030) that satisfies the bandwidth requirement (1420).

Statement 92. An embodiment of the inventive concept includes a method according to statement 82, wherein:

receiving (1905) a query (1305) from a machine (110, 140) includes receiving (2025) an isolation requirement (1415) from the machine (110, 140), the isolation requirement (1415) specifying isolation from a target application; and using (1910) a storage graph (705) to determine an response (1310) to the query (1305) includes selecting (2030) a subset of the nodes (735, 740, 745, 750, 755, 760, 830, 835, 840, 845, 850, 855, 860, 865, 1020, 1030) that satisfies the isolation requirement (1415).

Statement 93. An embodiment of the inventive concept includes a method according to statement 92, wherein selecting (2030) a subset of the nodes (735, 740, 745, 750, 755, 760, 830, 835, 840, 845, 850, 855, 860, 865, 1020, 1030) that satisfies the isolation requirement (1415) includes selecting (2030) the subset of the nodes (735, 740, 745, 750, 755, 760, 830, 835, 840, 845, 850, 855, 860, 865, 1020, 1030) that satisfies the isolation requirement (1415) such that no node (735, 740, 745, 750, 755, 760, 830, 835, 840, 845, 850, 855, 860, 865, 1020, 1030) in the subset of the nodes (735, 740, 745, 750, 755, 760, 830, 835, 840, 845, 850, 855, 860, 865, 1020, 1030) is being used by the target application.

Statement 94. An embodiment of the inventive concept includes a method, comprising:

receiving (1705) at least a partial system topology (1105) for a data center (105);

receiving (1710) local storage information (1110) for a host machine (110, 115, 120, 125, 130); and generating (1715) a storage graph (705) from the at least a partial system topology (1105) and the local storage information (1110), the storage graph (705) including a plurality of nodes (710, 715, 720, 725, 730, 735, 740, 745, 750, 755, 760, 830, 835, 840, 845, 850, 855, 860, 865, 1020, 1030) and at least one multi-weight edge (805, 810, 815, 820, 825, 910, 915, 1055, 1060), the plurality of nodes (710, 715, 720, 725, 730, 735, 740, 745, 750, 755, 760, 830, 835, 840, 845, 850, 855, 860, 865, 1020, 1030) including a root node (710) and at least one node (735, 740, 745, 750, 755, 760, 830, 835, 840, 845, 850, 855, 860, 865, 1020, 1030) representing one of a physical storage device (220, 505, 615, 620, 625, 630) or a virtual storage device (405, 410, 415), and an edge of the at least one multi-weight edge (805, 810, 815, 820, 825, 910, 915, 1055, 1060) between two nodes in the plurality of nodes (710, 715, 720, 725, 730, 735, 740, 745, 750, 755, 760, 830, 835, 840, 845, 850, 855, 860, 865, 1020, 1030).

Statement 95. An embodiment of the inventive concept includes a method according to statement 94, wherein generating (1715) a storage graph (705) from the at least a partial system topology (1105) and the local storage information (1110) includes:

identifying (1805) the root node (710) in the at least a partial system topology (1105) and the local storage information (1110);

identifying (1810) at least one internal node (715, 720, 725, 730, 735, 740, 745, 750, 755, 760) in the at least a partial system topology (1105) and the local storage information (1110), the at least one internal node (715, 720, 725, 730, 735, 740, 745, 750, 755, 760) representing at least one of a switch (505, 510), a router, a gateway, the host machine (110, 115, 120, 125, 130), and a physical storage device (220, 505, 615, 620, 625, 630); and identifying (1815) the at least one node (735, 740, 745, 750, 755, 760, 830, 835, 840, 845, 850, 855, 860, 865, 1020, 1030), the at least one node (735, 740, 745, 750, 755, 760, 830, 835, 840, 845, 850, 855, 860, 865, 1020, 1030) representing the virtual storage device (405, 410, 415) within at least one physical storage device (220, 505, 615, 620, 625, 630) within the at least a partial system topology (1105) and the local storage information (1110).

Statement 96. An embodiment of the inventive concept includes a method according to statement 95, wherein the virtual storage device (405, 410, 415) includes a merged virtual storage device (510), the merged virtual storage device (510) virtually combining at least two physical storage devices (220, 505, 615, 620, 625, 630).

Statement 97. An embodiment of the inventive concept includes a method according to statement 96, wherein generating (1715) a storage graph (705) from the at least a partial system topology (1105) and the local storage information (1110) includes:

determining (1835) a merged latency (1070) for the at least two physical storage devices (220, 505, 615, 620, 625, 630);

determining (1840) a merged bandwidth (1075) for the at least two physical storage devices (220, 505, 615, 620, 625, 630); and storing (1845) the merged latency (1070) and the merged bandwidth (1075) in the at least one multi-weight edge (805, 810, 815, 820, 825, 910, 915, 1055, 1060).

Statement 98. An embodiment of the inventive concept includes a method according to claim 97, wherein:

determining (1835) a merged latency (1070) for the at least two physical storage devices (220, 505, 615, 620, 625, 630) includes determining (1835) a weighted merged latency (1070) for the at least two physical storage devices (220, 505, 615, 620, 625, 630); and determining (1840) a merged bandwidth (1075) for the at least two physical storage devices (220, 505, 615, 620, 625, 630) includes determining (1840) a weighted merged bandwidth (1075) for the at least two physical storage devices (220, 505, 615, 620, 625, 630).

Statement 99. An embodiment of the inventive concept includes a method according to statement 97, wherein generating (1715) a storage graph (705) from the at least a partial system topology (1105) and the local storage information (1110) further includes:

determining (1830) a merged distance (1065) for the at least two physical storage devices (220, 505, 615, 620, 625, 630); and storing (1845) the merged distance (1065) in the at least one multi-weight edge (805, 810, 815, 820, 825, 910, 915, 1055, 1060).

Statement 100. An embodiment of the inventive concept includes a method according to statement 99, wherein determining (1830) a merged distance (1065) for the at least two physical storage devices (220, 505, 615, 620, 625, 630)

includes determining (1830) a weighted merged distance (1065) for the at least two physical storage devices (220, 505, 615, 620, 625, 630).

Statement 101. An embodiment of the inventive concept includes a method according to statement 94, wherein generating (1715) a storage graph (705) from the at least a partial system topology (1105) and the local storage information (1110) includes:

determining (1855) a latency (1070) between two nodes in the plurality of nodes (710, 715, 720, 725, 730, 735, 740, 745, 750, 755, 760, 830, 835, 840, 845, 850, 855, 860, 865, 1020, 1030);

determining (1860) a bandwidth (1075) between the two nodes in the plurality of nodes (710, 715, 720, 725, 730, 735, 740, 745, 750, 755, 760, 830, 835, 840, 845, 850, 855, 860, 865, 1020, 1030); and storing (1865) the latency (1070) and the bandwidth (1075) in the at least one multi-weight edge (805, 810, 815, 820, 825, 910, 915, 1055, 1060).

Statement 102. An embodiment of the inventive concept includes a method according to statement 101, wherein generating (1715) a storage graph (705) from the at least a partial system topology (1105) and the local storage information (1110) further includes:

determining (1850) a distance (1065) between the two nodes in the plurality of nodes (710, 715, 720, 725, 730, 735, 740, 745, 750, 755, 760, 830, 835, 840, 845, 850, 855, 860, 865, 1020, 1030); and storing (1865) the distance (1065) in the at least one multi-weight edge (805, 810, 815, 820, 825, 910, 915, 1055, 1060).

Statement 103. An embodiment of the inventive concept includes a method according to statement 101, wherein generating (1715) a storage graph (705) from the at least a partial system topology (1105) and the local storage information (1110) further includes:

determining (1870, 1875) an ID of one of the two nodes in the plurality of nodes (710, 715, 720, 725, 730, 735, 740, 745, 750, 755, 760, 830, 835, 840, 845, 850, 855, 860, 865, 1020, 1030); and storing (1880) the ID in the at least one multi-weight edge (805, 810, 815, 820, 825, 910, 915, 1055, 1060).

Statement 104. An embodiment of the inventive concept includes a method according to statement 103, wherein determining (1870, 1875) an ID of one of the two nodes in the plurality of nodes (710, 715, 720, 725, 730, 735, 740, 745, 750, 755, 760, 830, 835, 840, 845, 850, 855, 860, 865, 1020, 1030) includes determining (1870) a device physical ID (1080) of the host machine (110, 115, 120, 125, 130).

Statement 105. An embodiment of the inventive concept includes a method according to statement 103, wherein determining (1870, 1875) an ID of one of the two nodes in the plurality of nodes (710, 715, 720, 725, 730, 735, 740, 745, 750, 755, 760, 830, 835, 840, 845, 850, 855, 860, 865, 1020, 1030) includes determining (1875) a device interface ID (1085) of a physical storage device (220, 505, 615, 620, 625, 630) in the host machine (110, 115, 120, 125, 130).

Statement 106. An embodiment of the inventive concept includes a method, comprising:

receiving (1705) at least a partial system topology (1105) for a data center (105);

receiving (1710) local storage information (1110) for a host machine (110, 115, 120, 125, 130); and generating (1715) a storage graph (705) from the at least a partial system topology (1105) and the local storage information (1110), the storage graph (705) including a plurality of nodes (710, 715, 720, 725, 730, 735, 740, 745, 750, 755, 760, 830, 835, 840, 845, 850, 855, 860, 865, 1020, 1030) and at least one edge (805, 810, 815, 820, 825, 910, 915, 1055, 1060), the plurality of nodes (710, 715, 720, 725, 730, 735, 740, 745, 750, 755, 760, 830, 835, 840, 845, 850, 855, 860, 865, 1020, 1030) including a root node (710), a first node (735, 740, 745, 750, 755, 760, 830, 835, 840, 845, 850, 855, 860, 865, 1020, 1030) representing a physical storage device (220, 505, 615, 620, 625, 630), and a second node (735, 740, 745, 750, 755, 760, 830, 835, 840, 845, 850, 855, 860, 865, 1020, 1030) representing a virtual storage device (405, 410, 415), and an edge of the at least one edge (805, 810, 815, 820, 825, 910, 915, 1055, 1060) between two nodes in the plurality of nodes (710, 715, 720, 725, 730, 735, 740, 745, 750, 755, 760, 830, 835, 840, 845, 850, 855, 860, 865, 1020, 1030).

Statement 107. An embodiment of the inventive concept includes a method according to statement 106, wherein generating (1715) a storage graph (705) from the at least a partial system topology (1105) and the local storage information (1110) includes:

identifying (1805) the root node (710) in the at least a partial system topology (1105) and the local storage information (1110);

identifying (1810) at least one internal node (715, 720, 725, 730, 735, 740, 745, 750, 755, 760) in the at least a partial system topology (1105) and the local storage information (1110), the at least one internal node (715, 720, 725, 730, 735, 740, 745, 750, 755, 760) representing at least one of a switch (505, 510), a router, a gateway, the host machine (110, 115, 120, 125, 130), and a physical storage device (220, 505, 615, 620, 625, 630); and identifying (1815) the at least one node (735, 740, 745, 750, 755, 760, 830, 835, 840, 845, 850, 855, 860, 865, 1020, 1030), the at least one node (735, 740, 745, 750, 755, 760, 830, 835, 840, 845, 850, 855, 860, 865, 1020, 1030) representing the virtual storage device (405, 410, 415) within at least one physical storage device (220, 505, 615, 620, 625, 630) within the at least a partial system topology (1105) and the local storage information (1110).

Statement 108. An embodiment of the inventive concept includes a method according to statement 107, wherein the virtual storage device (405, 410, 415) includes a merged virtual storage device (510), the merged virtual storage device (510) virtually combining at least two physical storage devices (220, 505, 615, 620, 625, 630).

Statement 109. An embodiment of the inventive concept includes an article, comprising a tangible storage medium, the tangible storage medium having stored thereon non-transitory instructions that, when executed by a machine (110, 140), result in:

receiving (1905) a query (1305) from a machine (110, 140);

using (1910) a storage graph (705) to determine an response (1310) to the query (1305), the storage graph (705) including a plurality of nodes (710, 715, 720, 725, 730, 735, 740, 745, 750, 755, 760, 830, 835, 840, 845, 850, 855, 860, 865, 1020, 1030) and at least one multi-weight edge (805, 810, 815, 820, 825, 910, 915, 1055, 1060), the plurality of nodes (710, 715, 720, 725, 730, 735, 740, 745, 750, 755, 760, 830, 835, 840, 845, 850, 855, 860, 865, 1020, 1030) including a root node (710) and at least one node (735, 740, 745, 750, 755, 760, 830, 835, 840, 845, 850, 855, 860, 865, 1020, 1030) representing one of a physical storage device (220, 505, 615, 620, 625, 630) or a virtual storage device (405, 410, 415), and an edge of the at least one multi-weight edge (805, 810, 815, 820, 825, 910, 915, 1055, 1060) between two nodes in the plurality of nodes (710, 715, 720, 725, 730, 735, 740, 745, 750, 755, 760, 830, 835, 840, 845, 850, 855, 860, 865, 1020, 1030); and transmitting (1915) the response (1310) to the query (1305) to the machine (110, 140).

Statement 110. An embodiment of the inventive concept includes an article according to statement 109, wherein:

receiving (1905) a query (1305) from a machine (110, 140) includes receiving (1905) the query (1305) from an application on the machine (110, 140); and transmitting (1915) the response (1310) to the query (1305) to the machine (110, 140) includes transmitting (1915) the response (1310) to the query (1305) to the application on the machine (110, 140).

Statement 111. An embodiment of the inventive concept includes an article according to statement 109, wherein:

receiving (1905) a query (1305) from a machine (110, 140) includes receiving (2005) a desired replication factor (1405) from the machine (110, 140); and using (1910) a storage graph (705) to determine an response (1310) to the query (1305) includes selecting (2010) a subset of the nodes (735, 740, 745, 750, 755, 760, 830, 835, 840, 850, 855, 860, 865, 1020, 1030) that satisfies the desired replication factor (1405).

Statement 112. An embodiment of the inventive concept includes an article according to statement 111, wherein selecting (2010) a subset of the nodes (735, 740, 745, 750, 755, 760, 830, 835, 840, 845, 850, 855, 860, 865, 1020, 1030) that satisfies the desired replication factor (1405) includes selecting (2010) the subset of the nodes (735, 740, 745, 750, 755, 760, 830, 835, 840, 845, 850, 855, 860, 865, 1020, 1030) that satisfies the desired replication factor (1405) while maximizing bandwidth (1075).

Statement 113. An embodiment of the inventive concept includes an article according to statement 111, wherein:

receiving (1905) a query (1305) from a machine (110, 140) further includes receiving (2015) a latency constraint (1410) from the machine (110, 140); and selecting (2010) the subset of the nodes (735, 740, 745, 750, 755, 760, 830, 835, 840, 845, 850, 855, 860, 865, 1020, 1030) that satisfies the desired replication factor (1405) includes selecting (2010, 2020) the subset of the nodes (735, 740, 745, 750, 755, 760, 830, 835, 840, 845, 850, 855, 860, 865, 1020, 1030) that satisfies the desired replication factor (1405) and the latency constraint (1410).

Statement 114. An embodiment of the inventive concept includes an article according to statement 113, wherein selecting (2010, 2020) the subset of the nodes (735, 740, 745, 750, 755, 760, 830, 835, 840, 845, 850, 855, 860, 865, 1020, 1030) that satisfies the desired replication factor (1405) and the latency constraint (1410) includes selecting (2010, 2020) the subset of the nodes (735, 740, 745, 750, 755, 760, 830, 835, 840, 845, 850, 855, 860, 865, 1020, 1030) that satisfies the desired replication factor (1405), wherein the latency (1070) between any two nodes (735, 740, 745, 750, 755, 760, 830, 835, 840, 845, 850, 855, 860, 865, 1020, 1030) in the subset of the nodes (735, 740, 745, 750, 755, 760, 830, 835, 840, 845, 850, 855, 860, 865, 1020, 1030) that satisfies the desired replication factor (1405) is no greater than the latency constraint (1410).

Statement 115. An embodiment of the inventive concept includes an article according to statement 113, wherein selecting (2010, 2020) the subset of the nodes (735, 740, 745, 750, 755, 760, 830, 835, 840, 845, 850, 855, 860, 865, 1020, 1030) that satisfies the desired replication factor (1405) and the latency constraint (1410) includes selecting (2010, 2020) the subset of the nodes (735, 740, 745, 750, 755, 760, 830, 835, 840, 845, 850, 855, 860, 865, 1020, 1030) that satisfies the desired replication factor (1405) and the latency constraint (1410) while maximizing bandwidth (1075).

Statement 116. An embodiment of the inventive concept includes an article according to statement 109, wherein:

receiving (1905) a query (1305) from a machine (110, 140) includes receiving (2015) a latency constraint (1410) from the machine (110, 140); and using (1910) a storage graph (705) to determine an response (1310) to the query (1305) includes selecting (2010) a subset of the nodes (735, 740, 745, 750, 755, 760, 830, 835, 840, 845, 850, 855, 860, 865, 1020, 1030) that satisfies the latency constraint (1410).

Statement 117. An embodiment of the inventive concept includes an article according to statement 116, wherein selecting (2010, 2020) the subset of the nodes (735, 740, 745, 750, 755, 760, 830, 835, 840, 845, 850, 855, 860, 865, 1020, 1030) that satisfies the latency constraint (1410) includes selecting (2010, 2020) the subset of the nodes (735, 740, 745, 750, 755, 760, 830, 835, 840, 845, 850, 855, 860, 865, 1020, 1030) wherein the latency (1070) between any two nodes (735, 740, 745, 750, 755, 760, 830, 835, 840, 845, 850, 855, 860, 865, 1020, 1030) in the subset of the nodes (735, 740, 745, 750, 755, 760, 830, 835, 840, 845, 850, 855, 860, 865, 1020, 1030) is no greater than the latency constraint (1410).

Statement 118. An embodiment of the inventive concept includes an article according to statement 109, wherein:

receiving (1905) a query (1305) from a machine (110, 140) includes receiving (2035) a bandwidth requirement (1420) from the machine (110, 140); and using (1910) a storage graph (705) to determine an response (1310) to the query (1305) includes selecting (2030) a subset of the nodes (735, 740, 745, 750, 755, 760, 830, 835, 840, 845, 850, 855, 860, 865, 1020, 1030) that satisfies the bandwidth requirement (1420).

Statement 119. An embodiment of the inventive concept includes an article according to statement 109, wherein:

receiving (1905) a query (1305) from a machine (110, 140) includes receiving (2025) an isolation requirement (1415) from the machine (110, 140); and using (1910) a storage graph (705) to determine an response (1310) to the query (1305) includes selecting (2030) a subset of the nodes (735, 740, 745, 750, 755, 760, 830, 835, 840, 845, 850, 855, 860, 865, 1020, 1030) that satisfies the isolation requirement (1415).

Statement 120. An embodiment of the inventive concept includes an article according to statement 119, wherein selecting (2030) a subset of the nodes (735, 740, 745, 750, 755, 760, 830, 835, 840, 845, 850, 855, 860, 865, 1020, 1030) that satisfies the isolation requirement (1415) includes selecting (2030) the subset of the nodes (735, 740, 745, 750, 755, 760, 830, 835, 840, 845, 850, 855, 860, 865, 1020, 1030) that satisfies the isolation requirement (1415) such that no node (735, 740, 745, 750, 755, 760, 830, 835, 840, 845, 850, 855, 860, 865, 1020, 1030) in the subset of the nodes (735, 740, 745, 750, 755, 760, 830, 835, 840, 845, 850, 855, 860, 865, 1020, 1030) is being used by a target application.

Statement 121. An embodiment of the inventive concept includes an article, comprising a tangible storage medium, the tangible storage medium having stored thereon non-transitory instructions that, when executed by a machine (110, 140), result in:

receiving (1705) at least a partial system topology (1105) for a data center (105);

receiving (1710) local storage information (1110) for a host machine (110, 115, 120, 125, 130); and generating (1715) a storage graph (705) from the at least a partial system topology (1105) and the local storage information (1110), the storage graph (705) including a plurality of nodes (710, 715, 720, 725, 730, 735, 740, 745, 750, 755, 760, 830, 835, 840, 845, 850, 855, 860, 865, 1020, 1030) and at least one multi-weight edge (805, 810, 815, 820, 825, 910, 915, 1055, 1060), the plurality of nodes (710, 715, 720, 725, 730, 735, 740, 745, 750, 755, 760, 830, 835, 840, 845, 850, 855, 860, 865, 1020, 1030) including a root node (710) and at least one node (735, 740, 745, 750, 755, 760, 830, 835, 840, 845, 850, 855, 860, 865, 1020, 1030) representing one of a physical storage device (220, 505, 615, 620, 625, 630) or a virtual storage device (405, 410, 415), and an edge of the at least one multi-weight edge (805, 810, 815, 820, 825, 910, 915, 1055, 1060) between two nodes in the plurality of nodes (710, 715, 720, 725, 730, 735, 740, 745, 750, 755, 760, 830, 835, 840, 845, 850, 855, 860, 865, 1020, 1030).

Statement 122. An embodiment of the inventive concept includes an article according to statement 121, wherein generating (1715) a storage graph (705) from the at least a partial system topology (1105) and the local storage information (1110) includes:

identifying (1805) the root node (710) in the at least a partial system topology (1105) and the local storage information (1110);

identifying (1810) at least one internal node (715, 720, 725, 730, 735, 740, 745, 750, 755, 760) in the at least a partial system topology (1105) and the local storage information (1110), the at least one internal node (715, 720, 725, 730, 735, 740, 745, 750, 755, 760) representing at least one of a switch (505, 510), a router, a gateway, the host machine (110, 115, 120, 125, 130), and a physical storage device (220, 505, 615, 620, 625, 630); and identifying (1815) the at least one node (735, 740, 745, 750, 755, 760, 830, 835, 840, 845, 850, 855, 860, 865, 1020, 1030), the at least one node (830, 835, 840, 845, 850, 855, 860, 865, 1020, 1030) representing the virtual storage device (405, 410, 415) within at least one physical storage device (220, 505, 615, 620, 625, 630) within the at least a partial system topology (1105) and the local storage information (1110).

Statement 123. An embodiment of the inventive concept includes an article according to statement 122, wherein the virtual storage device (405, 410, 415) includes a merged virtual storage device (510), the merged virtual storage device (510) virtually combining at least two physical storage devices (220, 505, 615, 620, 625, 630).

Statement 124. An embodiment of the inventive concept includes an article according to statement 123, wherein generating (1715) a storage graph (705) from the at least a partial system topology (1105) and the local storage information (1110) includes:

determining (1835) a merged latency (1070) for the at least two physical storage devices (220, 505, 615, 620, 625, 630);

determining (1840) a merged bandwidth (1075) for the at least two physical storage devices (220, 505, 615, 620, 625, 630); and storing (1845) the merged latency (1070) and the merged bandwidth (1075) in the at least one multi-weight edge (805, 810, 815, 820, 825, 910, 915, 1055, 1060).

Statement 125. An embodiment of the inventive concept includes an article according to claim 124, wherein:

determining (1835) a merged latency (1070) for the at least two physical storage devices (220, 505, 615, 620, 625, 630) includes determining (1835) a weighted merged latency (1070) for the at least two physical storage devices (220, 505, 615, 620, 625, 630); and determining (1840) a merged bandwidth (1075) for the at least two physical storage devices (220, 505, 615, 620, 625, 630) includes determining (1840) a weighted merged bandwidth (1075) for the at least two physical storage devices (220, 505, 615, 620, 625, 630).

Statement 126. An embodiment of the inventive concept includes an article according to statement 124, wherein generating (1715) a storage graph (705) from the at least a partial system topology (1105) and the local storage information (1110) further includes:

determining (1830) a merged distance (1065) for the at least two physical storage devices (220, 505, 615, 620, 625, 630); and storing (1845) the merged distance (1065) in the at least one multi-weight edge (805, 810, 815, 820, 825, 910, 915, 1055, 1060).

Statement 127. An embodiment of the inventive concept includes an article according to statement 126, wherein determining (1830) a merged distance (1065) for the at least two physical storage devices (220, 505, 615, 620, 625, 630) includes determining (1830) a weighted merged distance (1065) for the at least two physical storage devices (220, 505, 615, 620, 625, 630).

Statement 128. An embodiment of the inventive concept includes an article according to statement 121, wherein generating (1715) a storage graph (705) from the at least a partial system topology (1105) and the local storage information (1110) includes:

determining (1855) a latency (1070) between two nodes in the plurality of nodes (710, 715, 720, 725, 730, 735, 740, 745, 750, 755, 760, 830, 835, 840, 845, 850, 855, 860, 865, 1020, 1030);

determining (1860) a bandwidth (1075) between the two nodes in the plurality of nodes (710, 715, 720, 725, 730, 735, 740, 745, 750, 755, 760, 830, 835, 840, 845, 850, 855, 860, 865, 1020, 1030); and storing (1865) the latency (1070) and the bandwidth (1075) in the at least one multi-weight edge (805, 810, 815, 820, 825, 910, 915, 1055, 1060).

Statement 129. An embodiment of the inventive concept includes an article according to statement 128, wherein generating (1715) a storage graph (705) from the at least a partial system topology (1105) and the local storage information (1110) further includes:

determining (1850) a distance (1065) between the two nodes in the plurality of nodes (710, 715, 720, 725, 730, 735, 740, 745, 750, 755, 760, 830, 835, 840, 845, 850, 855, 860, 865, 1020, 1030); and storing (1865) the distance (1065) in the at least one multi-weight edge (805, 810, 815, 820, 825, 910, 915, 1055, 1060).

Statement 130. An embodiment of the inventive concept includes an article according to statement 128, wherein generating (1715) a storage graph (705) from the at least a partial system topology (1105) and the local storage information (1110) further includes:

determining (1870, 1875) an ID of one of the two nodes in the plurality of nodes (710, 715, 720, 725, 730, 735, 740, 745, 750, 755, 760, 830, 835, 840, 845, 850, 855, 860, 865, 1020, 1030); and storing (1880) the ID in the at least one multi-weight edge (805, 810, 815, 820, 825, 910, 915, 1055, 1060).

Statement 131. An embodiment of the inventive concept includes an article according to statement 130, wherein determining (1870, 1875) an ID of one of the two nodes in the plurality of nodes (710, 715, 720, 725, 730, 735, 740, 745, 750, 755, 760, 830, 835, 840, 845, 850, 855, 860, 865, 1020, 1030) includes determining (1870) a device physical ID (1080) of the host machine (110, 115, 120, 125, 130).

Statement 132. An embodiment of the inventive concept includes an article according to statement 130, wherein determining (1870, 1875) an ID of one of the two nodes in the plurality of nodes (710, 715, 720, 725, 730, 735, 740, 745, 750, 755, 760, 830, 835, 840, 845, 850, 855, 860, 865, 1020, 1030) includes determining (1875) a device interface ID (1085) of a physical storage device (220, 505, 615, 620, 625, 630) in the host machine (110, 115, 120, 125, 130).

Statement 133. An embodiment of the inventive concept includes an article, comprising a tangible storage medium, the tangible storage medium having stored thereon non-transitory instructions that, when executed by a machine (110, 140), result in:

receiving (1705) at least a partial system topology (1105) for a data center (105);

receiving (1710) local storage information (1110) for a host machine (110, 115, 120, 125, 130); and generating (1715) a storage graph (705) from the at least a partial system topology (1105) and the local storage information (1110), the storage graph (705) including a plurality of nodes (710, 715, 720, 725, 730, 735, 740, 745, 750, 755, 760, 830, 835, 840, 845, 850, 855, 860, 865, 1020, 1030) and at least one edge (805, 810, 815, 820, 825, 910, 915, 1055, 1060), the plurality of nodes (710, 715, 720, 725, 730, 735, 740, 745, 750, 755, 760, 830, 835, 840, 845, 850, 855, 860, 865, 1020, 1030) including a root node (710), a first node (735, 740, 745, 750, 755, 760, 830, 835, 840, 845, 850, 855, 860, 865, 1020, 1030) representing a physical storage device (220, 505, 615, 620, 625, 630), and a second node (735, 740, 745, 750, 755, 760, 830, 835, 840, 845, 850, 855, 860, 865, 1020, 1030) representing a virtual storage device (405, 410, 415), and an edge of the at least one edge (805, 810, 815, 820, 825, 910, 915, 1055, 1060) between two nodes in the plurality of nodes (710, 715, 720, 725, 730, 735, 740, 745, 750, 755, 760, 830, 835, 840, 845, 850, 855, 860, 865, 1020, 1030).

Statement 134. An embodiment of the inventive concept includes an article according to statement 133, wherein generating (1715) a storage graph (705) from the at least a partial system topology (1105) and the local storage information (1110) includes:

identifying (1805) the root node (710) in the at least a partial system topology (1105) and the local storage information (1110);

identifying (1810) at least one internal node (715, 720, 725, 730, 735, 740, 745, 750, 755, 760) in the at least a partial system topology (1105) and the local storage information (1110), the at least one internal node (715, 720, 725, 730, 735, 740, 745, 750, 755, 760) representing at least one of a switch (505, 510), a router, a gateway, the host machine (110, 115, 120, 125, 130), and a physical storage device (220, 505, 615, 620, 625, 630); and identifying (1815) the at least one node (735, 740, 745, 750, 755, 760, 830, 835, 840, 845, 850, 855, 860, 865, 1020, 1030), the at least one node (735, 740, 745, 750, 755, 760, 830, 835, 840, 845, 850, 855, 860, 865, 1020, 1030) representing the virtual storage device (405, 410, 415) within at least one physical storage device (220, 505, 615, 620, 625, 630) within the at least a partial system topology (1105) and the local storage information (1110).

Statement 135. An embodiment of the inventive concept includes an article according to statement 134, wherein the virtual storage device (405, 410, 415) includes a merged virtual storage device (510), the merged virtual storage device (510) virtually combining at least two physical storage devices (220, 505, 615, 620, 625, 630).

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A system, comprising:
reception logic to receive a query from a machine;
transmission logic to transmit a response to the query to the machine;
storage for a storage graph, the storage graph including a plurality of nodes and at least one multi-weight edge, the plurality of nodes including a root node and at least one node representing one of a physical storage device or a virtual storage device, and an edge of the at least one multi-weight edge between two nodes in the plurality of nodes; and
a storage distance predictor to use the storage graph to generate the response to the query from the machine,
wherein the response to the query may be used to determine which nodes in the storage graph to allocate storage for an application, and
wherein the at least one multi-weight edge provides information about the weight of the multi-weight edges using at least two different weighting criteria, the at least two different weighting criteria including bandwidth and latency.

2. A system according to claim 1, wherein the at least one node includes a merged virtual storage device, the merged virtual storage device virtually combining at least two physical storage devices.

3. A system according to claim 2, wherein the at least one multi-weight edge includes an aggregate multi-weight edge to which the merged virtual storage device connects.

4. A system according to claim 3, wherein the aggregate multi-weight edge includes a merged latency and a merged bandwidth, the merged latency representing a mean of a plurality of latencies in edges of the at least one multi-weight edge that connect to one of the at least two virtual storage devices, the merged bandwidth representing a sum of a plurality of bandwidths in edges of the at least one multi-weight edge that connect to one of the at least two virtual storage devices.

5. A system according to claim 4, wherein:
the merged latency represents a weighted mean of the plurality of latencies in edges of the at least one multi-weight edge that connect to one of the at least two virtual storage devices; and
the merged bandwidth represents a weighted sum of the plurality of bandwidths in edges of the at least one multi-weight edge that connect to one of the at least two virtual storage devices.

6. A system according to claim 1, wherein:
the query includes a desired replication factor; and
the storage distance predictor includes a subset selector to select a subset of the nodes that satisfies the desired replication factor.

7. A system according to claim 1, wherein:
the query includes a latency constraint; and
the subset selector is operative to select the subset of the nodes that satisfies the latency constraint.

8. A system according to claim 1, wherein:
the query includes a bandwidth requirement; and
the storage distance predictor includes a subset selector to select a subset of the nodes that satisfies the bandwidth requirement.

9. A system according to claim 1, wherein:
the query includes an isolation requirement specifying isolation from a target application; and
the storage distance predictor includes a subset selector to select a subset of the nodes that satisfies the isolation requirement.

10. A system comprising:
a reception logic to receive at least a partial system topology for a data center and local storage information for a host machine; and
a storage graph generator to generate a storage graph using the at least a partial system topology and the local storage information, the storage graph including a plurality of nodes and at least one multi-weight edge, the plurality of nodes including a root node and at least one node representing one of a physical storage device or a virtual storage device, and an edge of the at least one multi-weight edge between two nodes in the plurality of nodes,
wherein the storage graph may be used to generate a response to a query, and the response to the query may be used to determine which nodes in the storage graph to allocate storage for an application, and
wherein the at least one multi-weight edge provides information about the weight of the multi-weight edges using at least two different weighting criteria, the at least two different weighting criteria including bandwidth and latency.

11. A system according to claim 10, wherein the storage graph generator includes:
a root node identifier to identify a node in the at least a partial system topology as the root node;
an internal node identifier to identify at least one internal node in the at least a partial system topology and the local storage information, the at least one internal node representing at least one of a switch, a router, a gateway, the host machine, and a physical storage device; and
a storage node identifier to identify the at least one node, the node representing the one of the physical storage device and the virtual storage device within at least one physical storage device within the at least a partial system topology and the local storage information.

12. A system according to claim 11, wherein the storage graph generator further includes a multi-weight edge generator to generate the at least one multi-weight edge.

13. A system according to claim 12, wherein:
the multi-weight edge generator includes:
a latency determiner to determine a latency between two nodes in the plurality of nodes; and
a bandwidth determiner to determine a bandwidth between the two nodes in the plurality of nodes; and
the multi-weight edge generator is operative to include the latency and the distance in the at least one multi-weight edge.

14. A system according to claim 12, wherein the virtual storage device includes a merged virtual storage device, the merged virtual storage device virtually combining at least two physical storage devices.

15. A system according to claim 14, wherein the multi-weight edge generator is operative to generate an aggregate multi-weight edge to which the merged virtual storage device connects.

16. A system according to claim 15, wherein the aggregate multi-weight edge includes a merged latency and a merged bandwidth, the merged latency representing a mean of a plurality of latencies in edges of the at least one multi-weight edge that connect to one of the at least two virtual storage devices, the merged bandwidth representing a sum of a plurality of bandwidths in edges of the at least one multi-weight edge that connect to one of the at least two virtual storage devices.

17. A system according to claim 16, wherein:
the merged latency represents a weighted mean of the plurality of latencies in edges of the at least one multi-weight edge that connect to one of the at least two virtual storage devices; and
the merged bandwidth represents a weighted sum of the plurality of bandwidths in edges of the at least one multi-weight edge that connect to one of the at least two virtual storage devices.

18. A method, comprising:
receiving a query from a machine;
using a storage graph to determine an response to the query, the storage graph including a plurality of nodes and at least one multi-weight edge, the plurality of nodes including a root node and at least one node representing one of a physical storage device or a virtual storage device, and an edge of the at least one multi-weight edge between two nodes in the plurality of nodes; and
transmitting the response to the query to the machine,
wherein the response to the query may be used to determine which nodes in the storage graph to allocate storage for an application, and
wherein the at least one multi-weight edge provides information about the weight of the multi-weight edges using at least two different weighting criteria, the at least two different weighting criteria including bandwidth and latency.

19. A method according to claim 18, wherein:
receiving a query from a machine includes receiving a desired replication factor from the machine; and
using a storage graph to determine an response to the query includes selecting a subset of the nodes that satisfies the desired replication factor.

20. A method according to claim 18, wherein:
receiving a query from a machine includes receiving a latency constraint from the machine; and
using a storage graph to determine an response to the query includes selecting a subset of the nodes that satisfies the latency constraint.

21. A method according to claim 18, wherein:
receiving a query from a machine includes receiving a bandwidth requirement from the machine; and
using a storage graph to determine an response to the query includes selecting a subset of the nodes that satisfies the bandwidth requirement.

22. A method according to claim 18, wherein:
receiving a query from a machine includes receiving an isolation requirement from the machine, the isolation requirement specifying isolation from a target application; and
using a storage graph to determine an response to the query includes selecting a subset of the nodes that satisfies the isolation requirement.

* * * * *